Oct. 7, 1969   E. C. FRAZE ET AL   3,470,837
APPARATUS FOR FORMING EASY-OPEN CAN ENDS
Filed Nov. 3, 1967   11 Sheets-Sheet 9
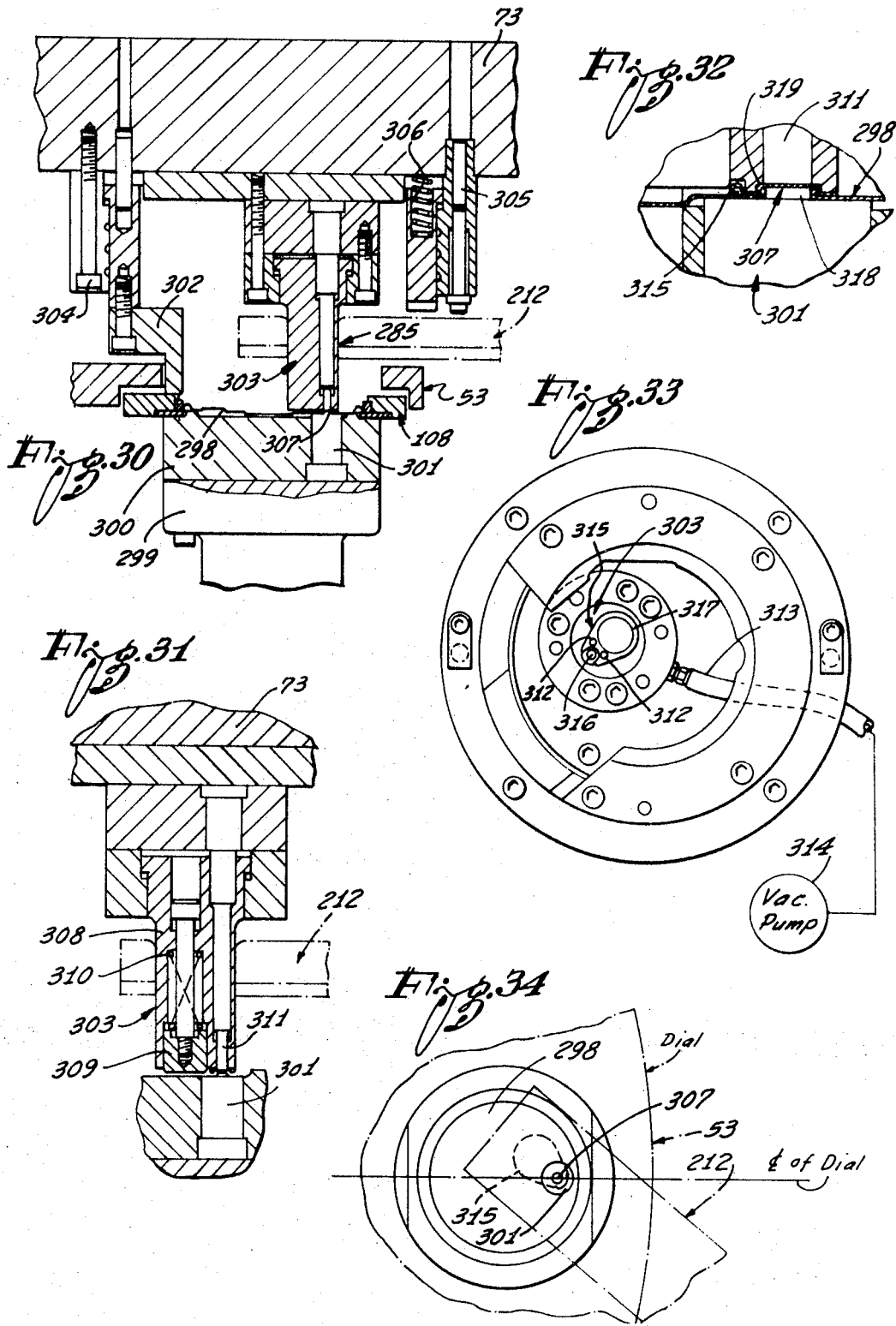

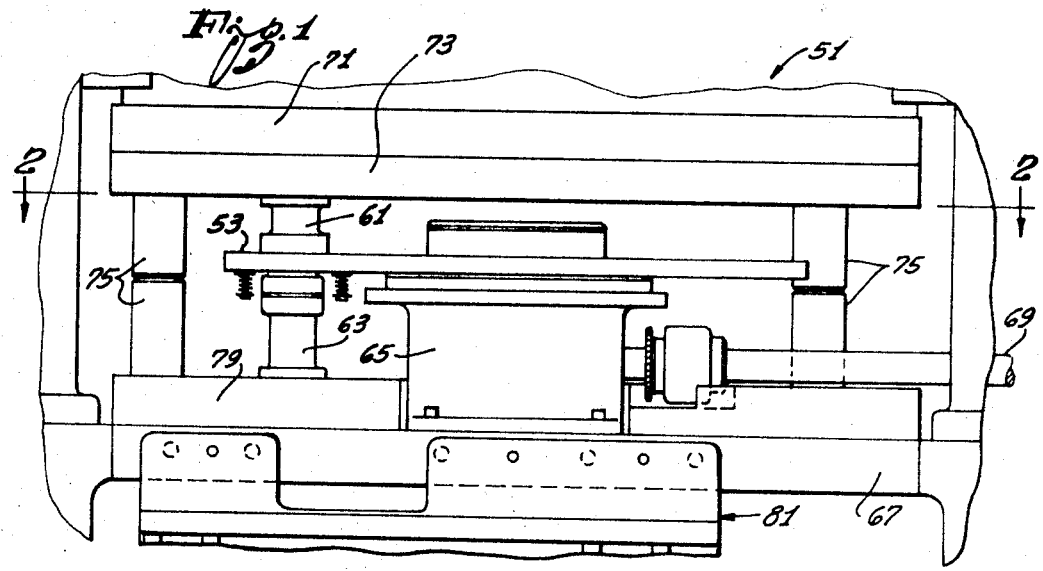
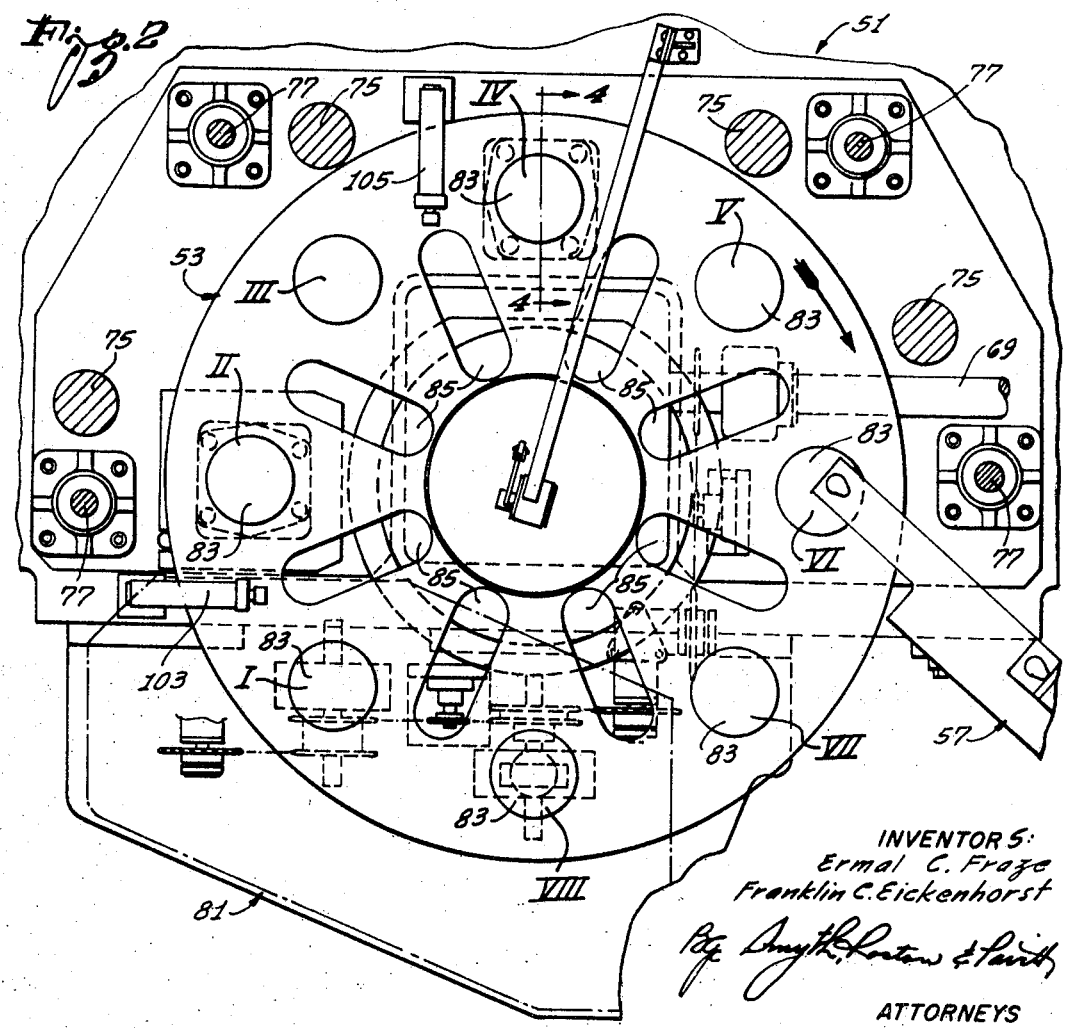

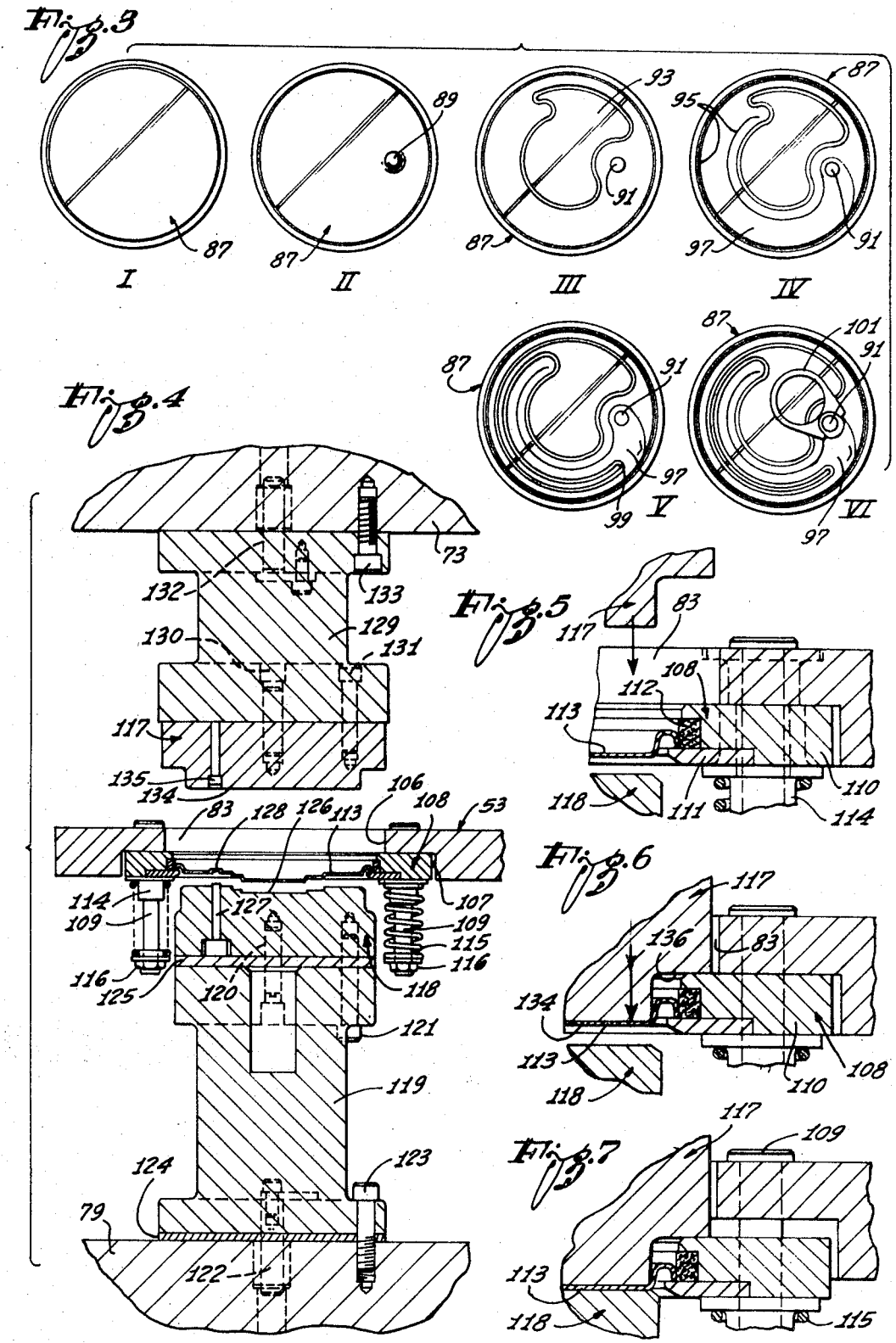

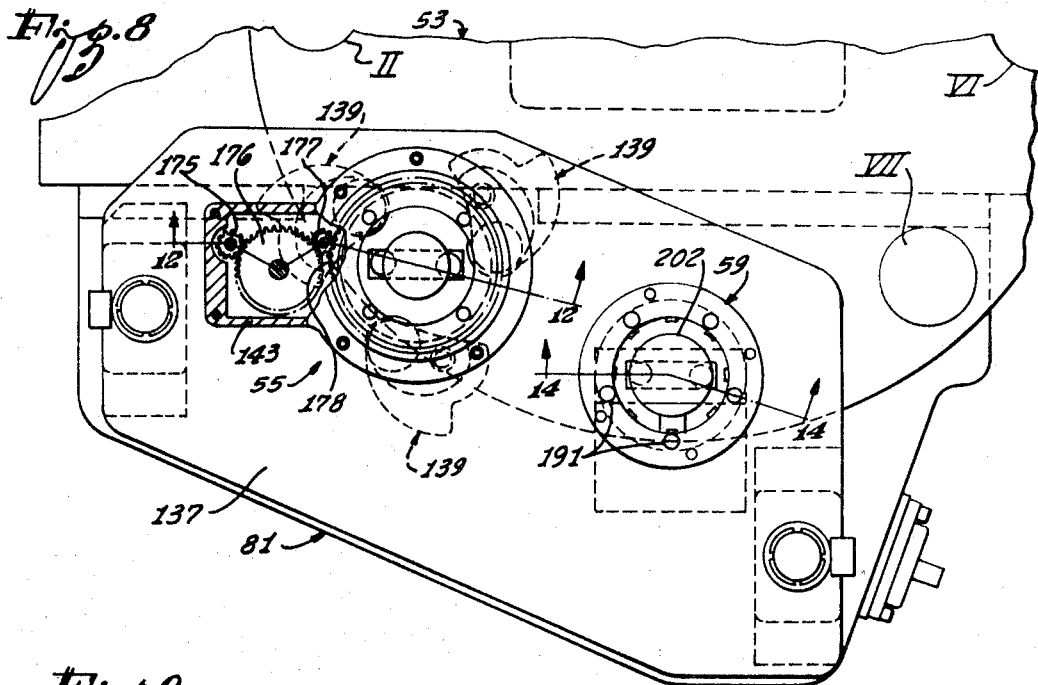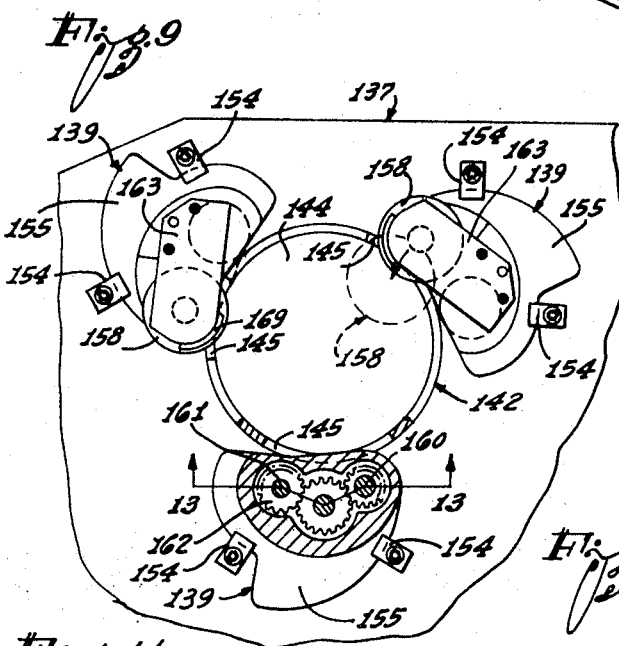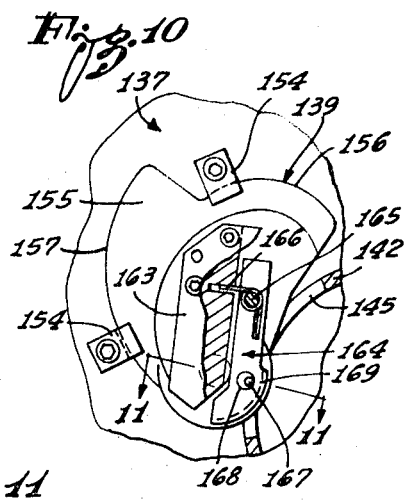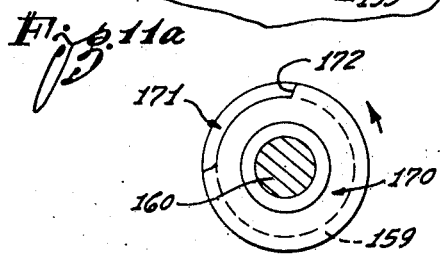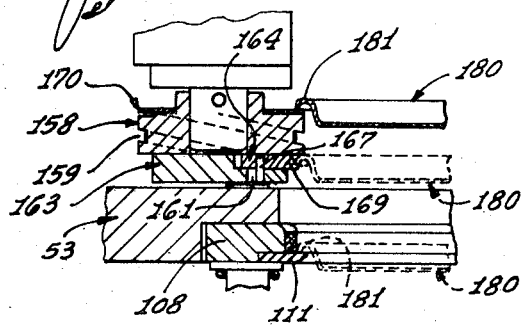

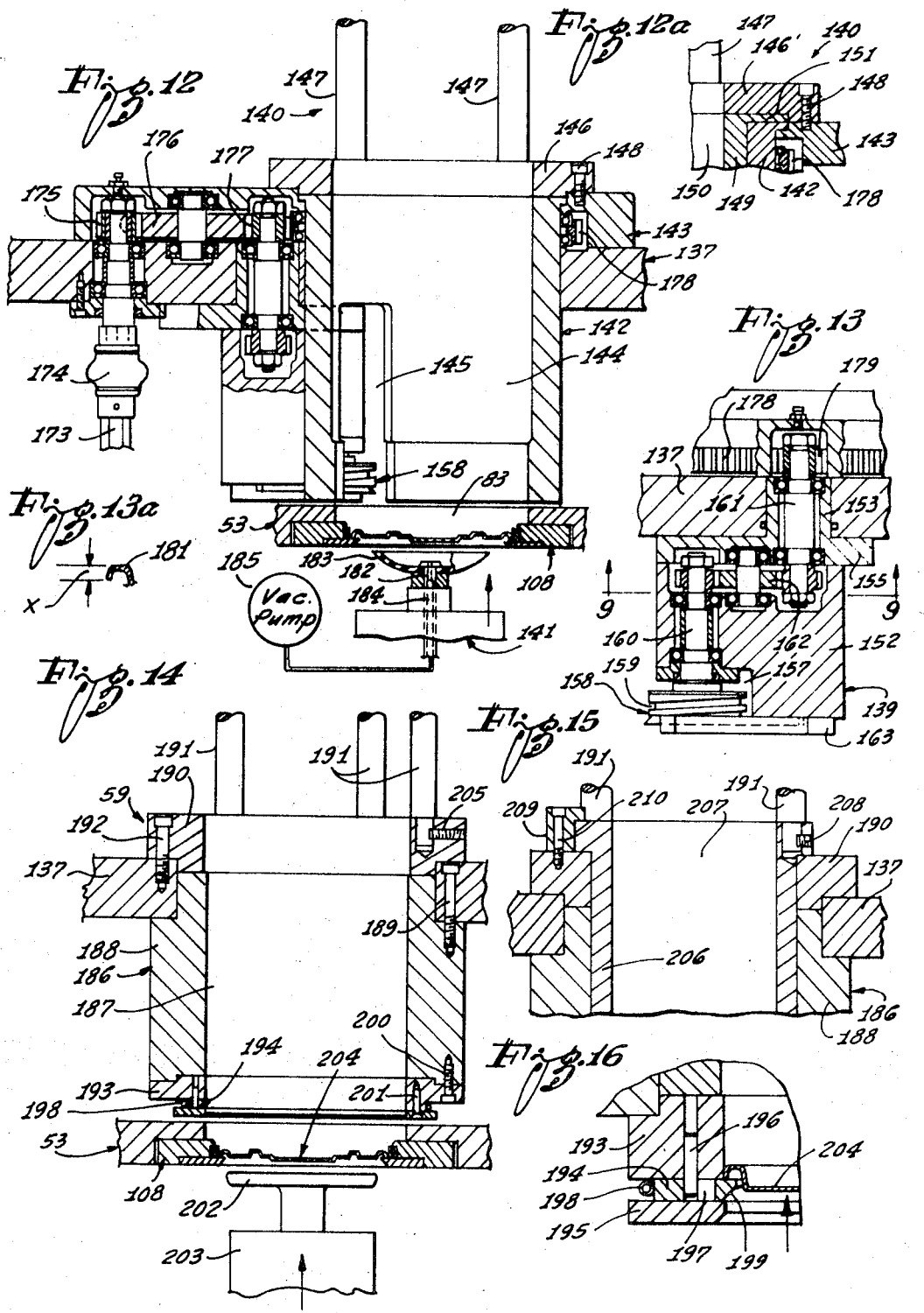

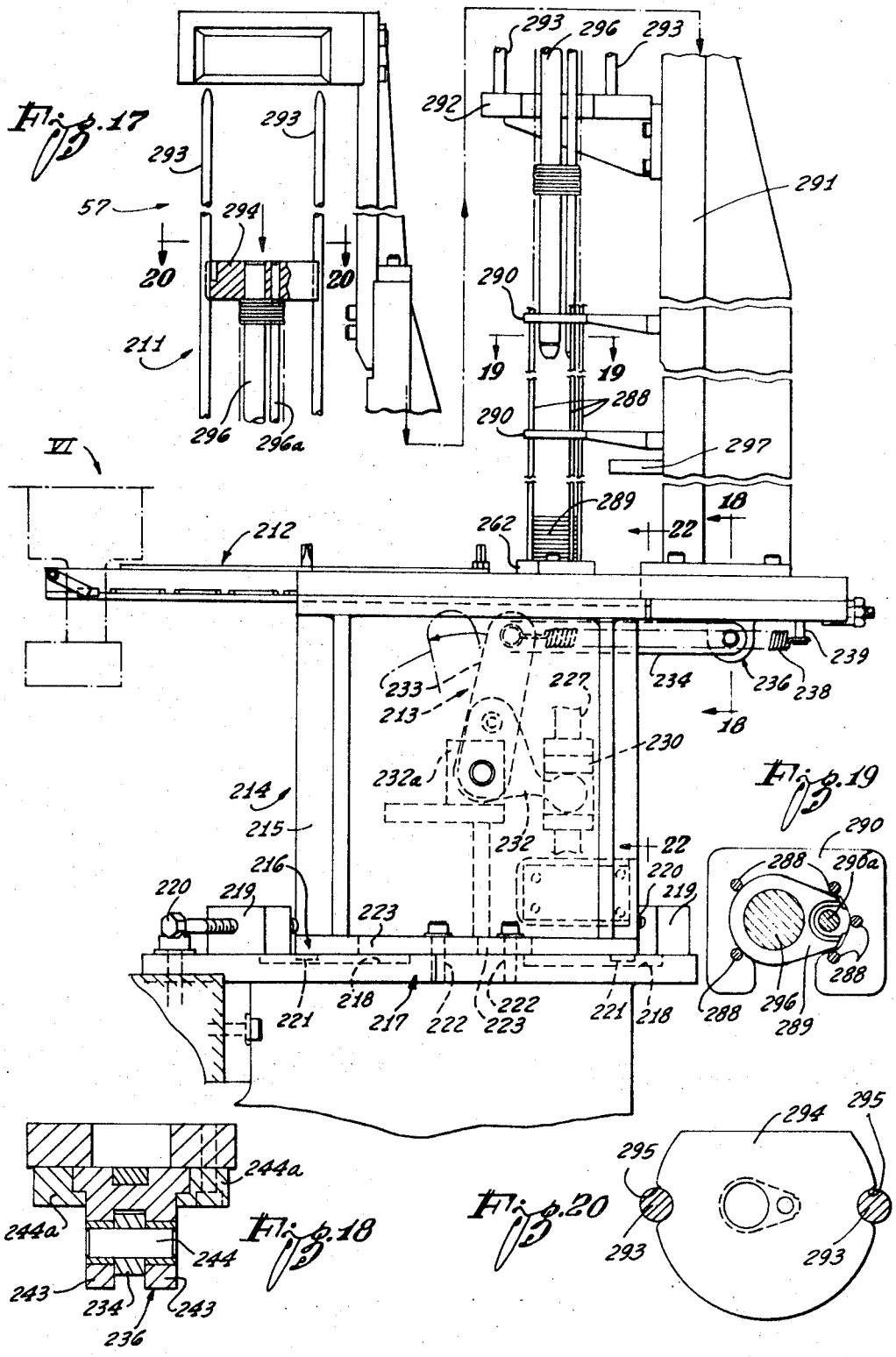

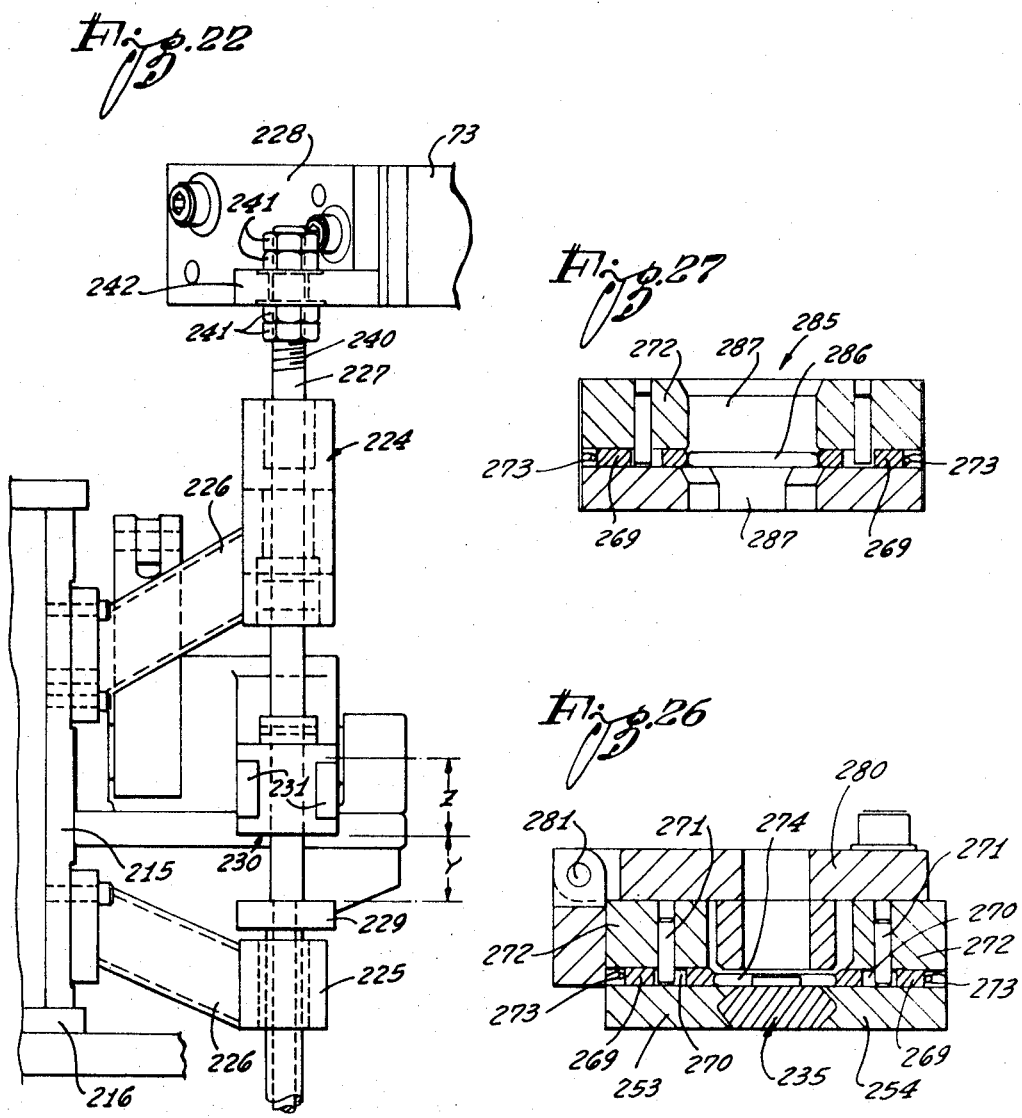

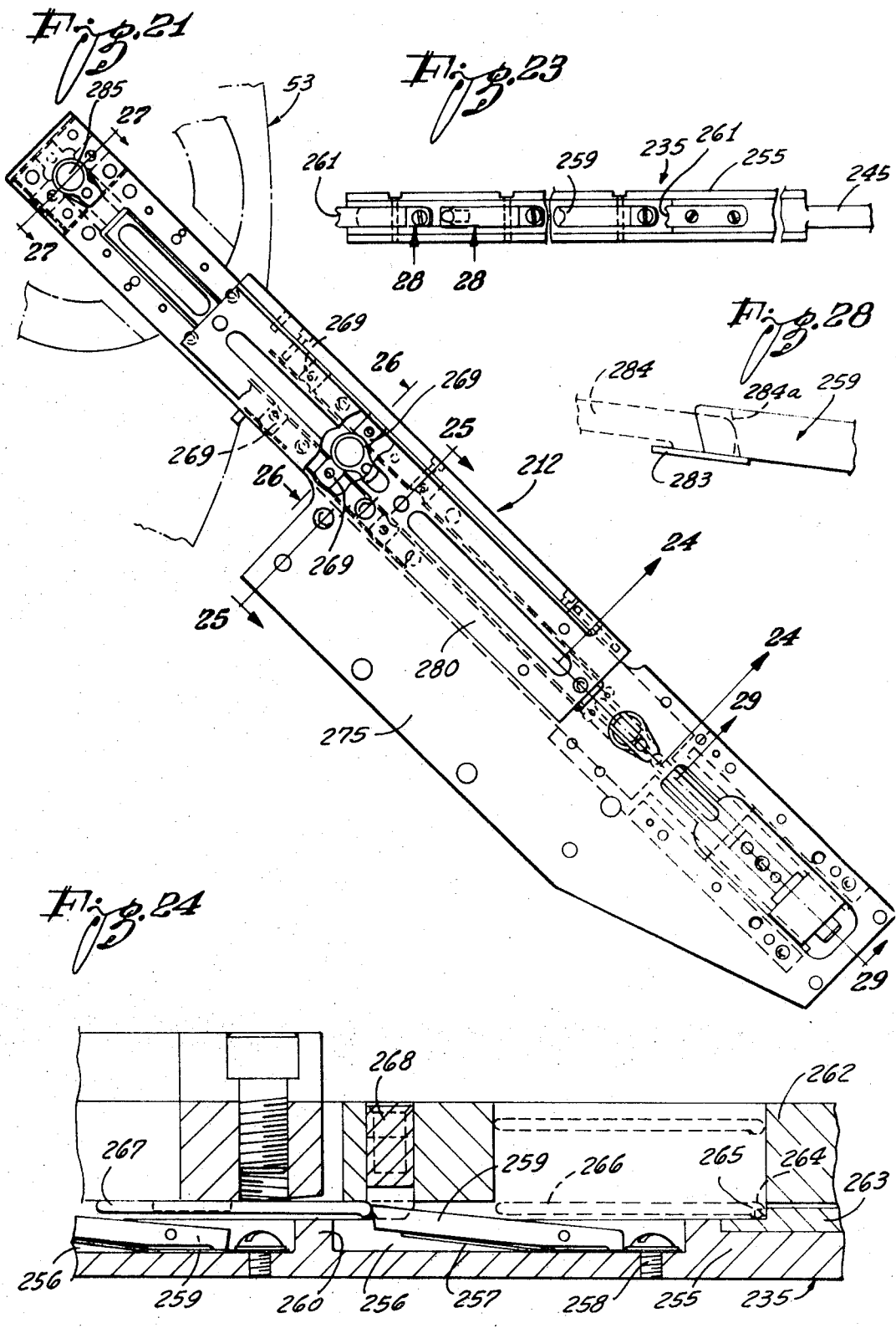

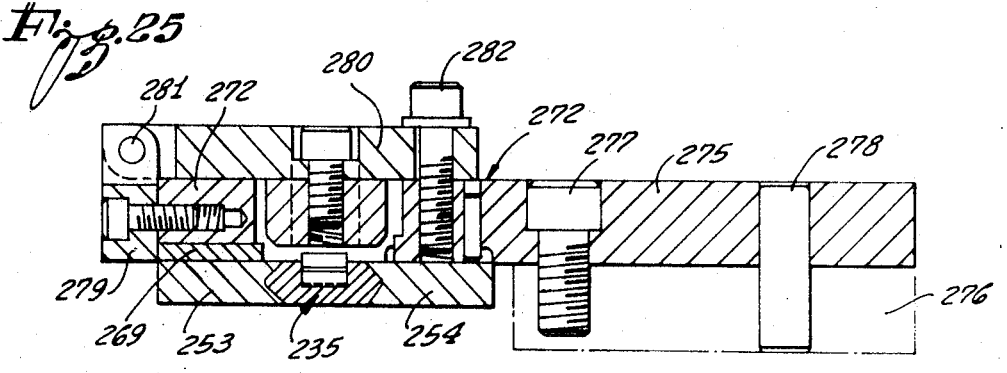
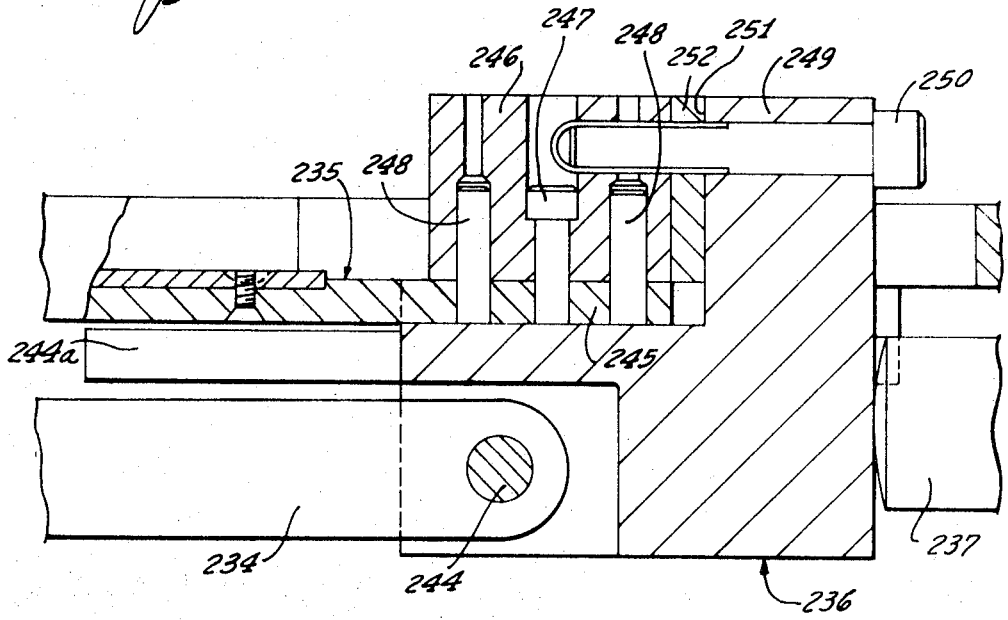

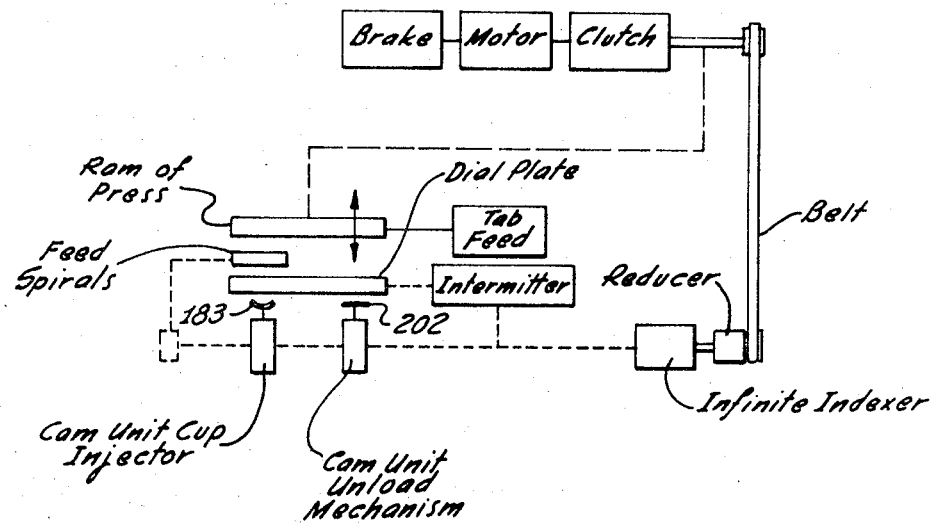

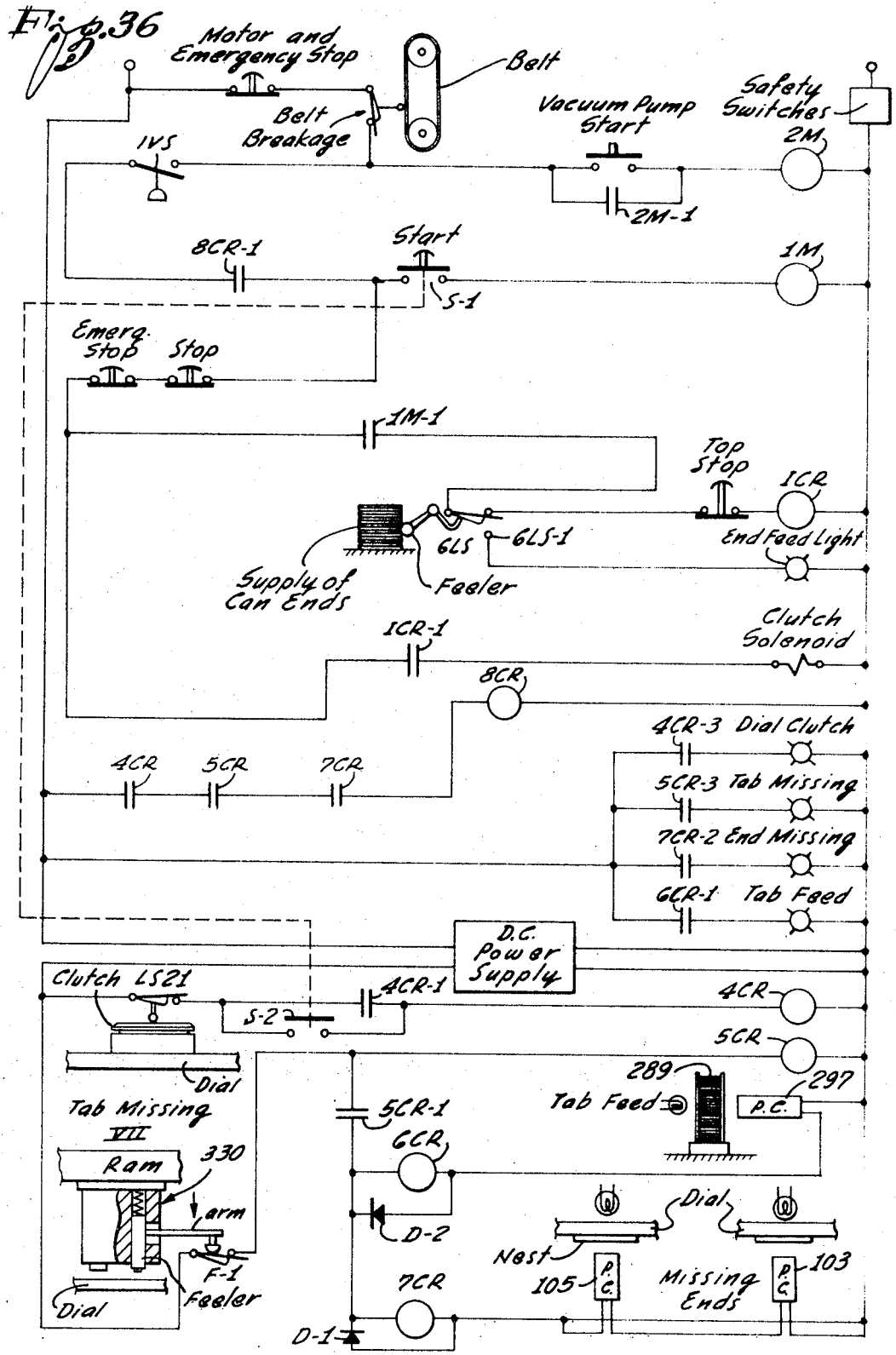

United States Patent Office 3,470,837
Patented Oct. 7, 1969

3,470,837
APPARATUS FOR FORMING EASY-OPEN CAN ENDS
Ermal C. Fraze, Dayton, and Franklin C. Eickenhorst, Mason, Ohio, assignors, by mesne assignments, to Ermal C. Fraze, Dayton, Ohio
Filed Nov. 3, 1967, Ser. No. 680,570
Int. Cl. B21d 51/38, 51/44
U.S. Cl. 113—1                                   32 Claims

ABSTRACT OF THE DISCLOSURE

This disclosure describes a machine particularly adapted for converting can ends into easy-open can ends. The machine as disclosed includes a main dial plate which rotates intermittently and which carries several can ends through several work stations at which various work operations are carried out. This machine embodies numerous concepts which permit it to be easily and rapidly converted to handle can ends of widely varying size and shape.

BACKGROUND OF THE INVENTION

As is well known, easy-open containers include a tab connected by a rivet, formed integrally with the can end to a removable tear strip. By lifting or otherwise appropriately manipulating the tab, the tear strip is severed from the can end leaving an opening therein through which access to the contents of the container may be had. The present invention relates particularly to a machine for converting can ends to easy-opening can ends; however, numerous features of this invention have application in other fields.

Numerous processes have been developed for fabricating easy-opening can ends and the present invention is not restricted to use with any one of these processes, but rather has applicability to a large number of such processes. A typical process for fabricating easy-opening can ends includes the formation of a rivet in a can end, which is integral with the material of the can end itself, and then scoring around the rivet to form a removable tear strip or panel. Finally, an apertured tab is positioned over the rivet and the rivet is staked to secure the tab to the tear strip. Several useful methods have been developed for formation of the integral rivet and for staking the rivet, and the machine of the present invention can be used to carry out all of these various methods.

Easy-opening can ends vary in size over a wide range which presently extends from 202's through 610's. Furthermore, easy-opening can ends have different shapes such as circular, oval, pear-shaped, and the sardine end. In addition, the trend in the industry is to apply easy-opening ends to an ever-increasing range of can end sizes and configurations. The use of easy-opening can ends of various sizes and shapes has given rise to a very significant problem in the industry, namely, the conversion of the prior art easy-open can end machines to accommodate such wide ranges of sizes and shapes. The machine now being widely used for fabrication of easy-opening can ends is particularly adapted for high-speed production of can ends of identical or substantially similar sizes and shapes. It is a very difficult and time-consuming job to convert this machine to run can ends of different sizes and shapes. Furthermore, a single prior art machine cannot be converted in the field to run all of the can end sizes and shapes referred to above, but can only be converted to run can ends of nearly identical size and shape. Of course, during such conversion, the machine cannot be operated and, therefore, valuable production time is lost. This problem is particularly acute among the smaller producers of easy-opening can ends, who only have a relatively small number of can end machines at their disposal.

The presently used machine has a main dial plate with several areas thereon for receiving and carrying can ends through several work stations at which the necessary work operations are performed. A load dial is rotatably mounted adjacent the main dial. Can ends are fed into the load dial at one area thereon, and the load dial is rotated until such area is directly beneath a load station of the main dial plate, at which station the can end is moved from the load dial into the main dial plate. The tabs are fabricated directly on the machine and fed into a tab dial which rotates the tabs to a staking station immediately beneath the main dial plate. The centers of the load dial and tab dial lie just outside of the perimeter of the main dial plate and tend to impede access to the main dial plate. Thus, the presence of these auxiliary dials makes working in or around the main dial plate quite difficult and, as a result, the two auxiliary dials must be removed prior to attempting any work on the machine in or around the main dial plate. Such removal of the auxiliary dials lengthens considerably the time required to perform such work.

The load dial is adapted to receive and carry a can end of a particular size and configuration, and similarly, the tab dial is adapted to receive and carry a tab of a particular size and configuration. Thus, if the operator wishes to run can ends of a different size or configuration or utilize a tab of a different size or configuration, the load dial and/or the tab dial must be removed and replaced with a dial having suitable characteristics for the different can ends or tabs. This change-over is not only quite time consuming, but also requires that the user purchase several different sizes of tab and load dials. Similarly, any significant change in size or shape of the can end requires that the main dial plate also be changed to accommodate such new size or configuration of can end, thereby further increasing the amount of lost production time and necessitating the purchase and presence of numerous main dial plates.

The main dial plate rotates intermittently to stop each of the can ends sequentially at each of the work stations, at which appropriate tooling first forms the rivet and then stakes the rivet to secure the tab to the tear strip. In the event that this tooling must be changed, either because it is worn or because of a change in the desired can end design, both of the auxiliary dials must first be removed in order to provide access to such tooling. The tooling, which is mounted on support blocks, must be removed with such support blocks affixed thereto and new tooling and support blocks provided. It can be seen, therefore, that any tooling changes cannot be accomplished rapidly.

This prior art machine utilizes a can end feed mechanism to supply individual can ends to the load dial. This feed mechanism must be removed and a new one substituted therefor whenever the size or configuration of the can end changes. Similarly, the hardware at the unload station at which the easy-opening can ends are removed from the main dial plate must also be changed with a change of size or configuration of the can end. These requirements, like those discussed above, result in further loss of production time and require that each machine have numerous substitute parts to compensate for each size can end that it is desired to be run on such machine.

SUMMARY OF THE INVENTION

A principal object of this invention is to provide an easy-open can end machine which will run can ends having wider size and shape variations and which can be converted to run can ends of different sizes and shapes much more rapidly than with prior art machines. Furthermore, this conversion does not require the substitution of a large amount of hardware as is true in the prior art machine. In this connection, one feature of the invention is the use of a single main dial plate and the elimination of the load dial and tab dial heretofore used for can end feeding and tab feeding. The elimination of these auxiliary dials makes the main dial plate and the tooling therearound much more accessible so that numerous changes and repairs can now be made without the need for removal of obstructing structures as a prelude to making such changes or repairs. Furthermore, the elimination of the auxiliary dials reduces the number of working parts of the machine and eliminates the need for storing of several of the auxiliary dials for the purpose of accommodating can ends and tabs of different sizes and configuration.

The main dial plate of the machine of this invention is mounted in a conventional press for intermittent rotary movement about a generally vertical axis and has a plurality of nests thereon for receiving and supporting can ends therein. Various items of tooling are located around the main dial plate, and the main dial plate sequentially brings each of the nests to a momentary halt at each of the work stations at which the tooling is located to allow the performance or work operations on the can end. The tooling of this invention is preferably mounted on support blocks which in turn are mounted in conventional press. The tooling is removable from the support blocks while leaving the support blocks mounted on the machine to thereby permit a much more rapid change of tooling than has been possible heretofore. Furthermore, the tooling is accessible without removing the main dial plate or other structure of the machine. The tooling is operated by the ram of the press.

An important feature of this invention is that the can ends are fed directly into the main dial plate without the use of an intermediary such as the load dial of the prior art machine. The present invention teaches that this can be accomplished by positioning a column of can ends at a load station adjacent the main dial plate and sequentially feeding the can end at the end of such column into each nest of the main dial plate as such nest is momentarily brought to rest at the load station. This concept of the invention can be embodied in a can end loading or feeding mechanism which supports the column of can ends above the main dial plate, and which includes at least two feed spirals or other suitable movable members for engaging peripheral regions of the lowermost can end of the column to move such lowermost can end to a position spaced from the column of can ends. The lowermost can end can be advantageously moved from such position into the nest therebelow by an extendible suction member mounted beneath the main dial plate, which automatically extends upwardly and then retracts to pull the can end from such position into the nest, to thereby positively load such can end in the nest.

The present invention teaches that a single can end feeding mechanism can be utilized for can ends of a wide range of sizes and shapes if the feed spirals are mounted for generally lateral movement generally toward and away from the lowermost can end, i.e., generally radially of the can end. It will be readily appreciated that if the feed spirals are moved radially, the spiral groove in the peripheral surface thereof will be in position to engage peripheral regions of a can end of a different size.

As the feed spirals must rotate to move or screw the lowermost can end away from the column of can ends, it is necessary that such lateral movement of the feed spirals be accomplished without necessitating the making of significant changes in the drive train for imparting rotary motion to such feed spirals. The present invention solves this problem by teaching that the feed spirals should preferably be rotatably mounted on a frame or housing and the housing should be mounted for movement on a supporting structure to effect the lateral movement of the feed spirals. More particularly, and according to the particular embodiment described herein, each of the feed spirals is driven by a drive train mounted in the housing and the drive train includes a rotatable input shaft projecting out of the frame and drivingly connected to an external drive member. The frame is then mounted for pivotal movement about an axis which coincides with the axis of rotation of the input shaft. Thus, the frame can be pivoted about such axis without disturbing in any way the drive train means for imparting rotary motion of the feed spirals.

The column of can ends is supported in storage means, the lowermost end of which preferably includes a sleeve-like member having opening means therein through which the feed spirals project. In order that the sleeve can properly support can ends of various sizes and shapes, a plurality of insert sleeves or liners are provided which can be inserted within such sleeve to permit the necessary size or shape adjustment.

Each of the feed spirals has a relatively flat cutout plate mounted on the upper surface thereof for cutting out the lowermost can end of the column and for retaining the remainder of the column within the sleeve. The effective thickness of this cutout plate is variable by using shims to vary the elevation thereof above the feed spirals to thereby permit adjustment for can end designs having different curl heights. Of course, the can end load mechanism of this invention can be used to feed can ends or similarly shaped articles into various other items of equipment and is not limited to use with easy-opening can end machines.

The main dial plate has several relatively large apertures therein in which the nests for receiving and supporting the cam ends are mounted. Each of the nests are sized and shaped to receive a can end of a particular size and shape; however, the nests can be quickly interchanged to thereby permit rapid changeover of the machine. Preferably, therefore, the apertures in the main dial plate should be relatively large to allow the insertion of a nest therein of sufficient size to accommodate the largest can end that it is desired to run on such main dial plate. The nests can be changed without the need for removing the main dial plate or any significant amount of obstructing structure.

Another important concept of the present invention is the direct feeding of the tabs into the staking station without the need for a tab dial. This is preferably accomplished by the use of a tab feed mechanism which indexes the tabs along a generally linear, or at least non-circular path, to the staking station. When the tab reaches the final indexing position of the tab feed mechanism, the tab is at the staking station, and upon the next downstroke of the ram of the press, the tab is automatically removed from such final indexing position and positioned over the rivet of the can end.

The tab feed mechanism is located closely adjacent the ram, and for convenience, as well as to assure proper synchronization of the tab feed mechanism with other portions of the machine, the tab feed mechanism is preferably driven directly by the ram. The tab feed mechanism includes a reciprocable slide which advances the tabs a single step on each forward stroke thereof. The tabs are held at the advanced position during the return stroke of the slide.

The tabs used with this machine are preformed on a separate machine and are arranged in a column above a rearward section of the slide. As the tabs require some time to settle to properly position the lowermost tab adjacent the slide following a return stroke of the slide, the present invention provides dwell time between the end of the return stroke and the beginning of the next forward stroke of the slide. As the amount of dwell time required varies depending upon the particular size and configuration of the tab, the present invention provides for adjusting of this dwell time by making a simple adjustment in the linkage interconnecting the ram and the slide. As the stroke of the ram may vary somewhat from one machine to the next, the same linkage adjustment provides for adjustment of the stroke of the slide to compensate for any such variations in ram stroke. Of course, the tab feed mechanism can be used to feed tabs of various sizes and configurations and can be used to feed tabs or similar articles to items of equipment other than easy-open can end machines.

The placement of the rivet which secures the tab to the tear strip may vary from one can end design to another. Accordingly, the present invention provides for movement of the tab feed mechanism relative to the staking station to thereby accurately position the final indexing position of the slide to compensate for any change in rivet location. Thus, the securing aperture in the tab can be positioned directly above the rivet at the final indexing positions so that upon the downstroke of the ram, the tab will be moved out of the tab feed mechanism and over the rivet. Numerous other advantageous features of the tab mechanism are described in connection with the description of the specific embodiment.

When all of the necessary operations have been performed on the can end, it is removed from the main dial plate at an unload station. The unload equipment is adjustable to permit handling of can ends of different sizes and shapes and preferably includes a sleeve member positioned at the unload station on one side of the main dial plate and an extendible member positioned at the unload station on the other side of the main dial plate. The push member is extendible to push the can end at the unload station out of the nest and into the sleeve where it is suitably retained. The sleeve can be provided with insert sleeves or liners of suitable size and shape to accommodate can ends of different sizes and configurations.

The invention both as to its organization and method of operation together with further features and advantages thereof may best be understood by reference to the following description taken in connection with the accompanying drawings.

BRIEF DESCRIPTION OF THE DRAWINGS

FIG. 1 is a fragmentary front elevational view of the main dial plate and the tooling mounted in a conventional press.

FIG. 2 is a fragmentary plan view partially in section taken generally along line 2—2 of FIG. 1 and slightly enlarged with respect to FIG. 1.

FIG. 3 is a plan view illustrating the operations performed sequentially on the can end at each of the stations I-VI.

FIG. 4 is an enlarged fragmentary sectional view taken along line 4—4 of FIG. 2 and illustrating the tooling and a nest as it would appear at a typical station around the main dial plate.

FIG. 5 is an enlarged fragmentary sectional view of a segment of FIG. 4 showing the arrangement of the parts as the punch begins to descend.

FIG. 6 is a fragmentary sectional view similar to FIG. 5 with the punch being advanced to the position in which it contacts the can end.

FIG. 7 is a fragmentary sectional view similar to FIGS. 5 and 6 with the punch having been advanced to the bottom of its stroke to score the can end.

FIG. 8 is a fragmentary plan view of the load and unload mechanism with parts thereof broken away to illustrate a portion of the drive train for the load mechanism.

FIG. 9 is a bottom view of the can end loading mechanism with the components thereof reversed left to right in comparison with FIG. 8 and illustrating in phantom line an inner position of one of the feed spirals.

FIG. 10 is a fragmentary bottom view of one of the feed spirals of the can end load mechanism with a portion broken away and shown in section to illustrate the spring loaded retainer which is located immediately below the feed spiral.

FIG. 11 is a fragmentary sectional view taken along line 11—11 of FIG. 10 showing the relationship between the load mechanism and a nest of the main dial plate.

FIG. 11a is a top plan view of one of the feed spirals and the cutout plate mounted thereon with the drive shaft for the feed spiral being shown in section.

FIG. 12 is an enlarged sectional view taken along the line 12—12 of FIG. 8 illustrating a substantial portion of the load mechanism.

FIG. 12a is a fragmentary sectional view of the can end storage means modified to store can ends of a different size and/or shape.

FIG. 13 is an enlarged fragmentary sectional view taken along line 13—13 of FIG. 9 and showing a feed spiral, a frame or housing for the feed spiral, and the drive train for the feed spiral.

FIG. 13a is an enlarged fragmentary sectional view of a peripheral region of a typical can end.

FIG. 14 is an enlarged fragmentary sectional view taken along line 14—14 of FIG. 8 and illustrating the equipment utilized to unload the finished product from the main dial plate.

FIG. 15 is a fragmentary sectional view similar to FIG. 14 showing a modified arrangement of the unloading equipment in which a liner or insert sleeve is provided to accommodate can ends of a smaller size.

FIG. 16 is an enlarged fragmentary sectional view showing a lower corner of the sleeve at the unload station illustrating particularly the spring biased fingers which support the easy-open can end after it has been pushed out of the nest in the main dial plate.

FIG. 17 is a side elevational view of the tab feed mechanism.

FIG. 18 is a sectional view taken along line 18—18 of FIG. 17 and illustrating the drive connection between the reciprocating slide and the linkage drivingly connecting such slide to the ram of the press.

FIG. 19 is a sectional view taken along line 19—19 of FIG. 17 and showing the tab magazine for supplying tabs to the slide.

FIG. 20 is a sectional view taken along line 20—20 of FIG. 17 and showing the guide rod arrangement for the removal of the tab alignment and carrier rods for positioning the tab in the magazine.

FIG. 21 is a top plan view of the tab feed mechanism with the tab feed magazine removed.

FIG. 22 is an end elevational view taken along line 22—22 of FIG. 17 and showing the linkage for reciprocating the slide.

FIG. 23 is a top plan view of the slide for the tab feed mechanism.

FIG. 24 is an enlarged fragmentary sectional view taken along line 14—14 of FIG. 21 and showing the reciprocable slide.

FIG. 25 is an enlarged fragmentary sectional view taken along line 25—25 of FIG. 21.

FIG. 26 is an enlarged sectional view taken along line 16—16 of FIG. 21.

FIG. 27 is an enlarged sectional view taken along line 27—27 of FIG. 1 and illustrating the final indexing position of the tab feed mechanism.

FIG. 28 is an enlarged fragmentary elevational view of the driver on the reciprocable slide which is immediately adjacent the forwardmost driver.

FIG. 29 is an enlarged fragmentary sectional view taken along line 29—29 of FIG. 21 and showing the connector and spacer plate for the slide and the driving linkage therefor.

FIG. 30 is a sectional view taken through station VI of FIG. 2 showing the details of the tooling which removes the tab from the final indexing position of the tab feed mechanism and positions the tab over the rivet of the can end and then stakes the rivet to secure the tab to the can end.

FIG. 31 is a fragmentary sectional view taken generally perpendicular to the staking tool shown in FIG. 27 and showing the pilot body which locates the tab prior to the staking operation.

FIG. 32 is an enlarged fragmentary sectional view showing the position of the tooling at the completion of the staking operation.

FIG. 33 is a bottom view of the equipment shown in FIG. 30 illustrating the vacuum positioning device that holds the tab in position as it is moved downwardly immediately prior to the staking operation.

FIG. 34 is a schematic view showing the relationship between the tab feeder and the main dial plate during the staking operation.

FIG. 35 is a schematic view illustrating the drive train for driving all of the various power actuated components of the machine.

FIG. 36 is a schematic wiring diagram illustrating the electrical controls for the machine.

DESCRIPTION OF THE PREFERRED EMBODIMENTS

Referring to the drawings and in particular to FIGS. 1 and 2 thereof, reference numeral 51 designates a machine for fabricating easy-opening can ends. Generally, the machine 51 includes a main dial plate 53 having several fixed stations designated I–VIII, respectively, in FIG. 2 spaced circumferentially therearound, a can end loading or feeding mechanism 55 positioned at station I and illustrated completely in FIGS. 8–13, a tab feed mechanism 57 shown diagrammatically in FIG. 2 and illustrated completely in FIGS. 17–29, and an unload mechanism 59 positioned at station VIII and illustrated completely in FIGS. 14–16. Work operations are performed at least at some of the work stations by tooling such as tooling 61 and 63 shown generally in FIG. 1.

The main dial plate 53 is mounted for rapid intermittent rotary movement about a vertical axis by a conventional intermitter 65 (FIG. 1), which is fixedly mounted on a platen 67 and which is driven by a drive shaft 69 which receives its power from the press drive motor. The press is a conventional commercially available item of equipment, and therefore is not described in detail except for those portions thereof which are immediately adjacent the easy-open can end fabricating equipment.

A ram 71 (FIG. 1) of the press has a punch holder 73 affixed thereto and is mounted for reciprocation along a generally vertical line above the main dial plate 53. The downstroke of the punch holder 73 is limited by a plurality of stop blocks 75, and the reciprocation of the ram is guided by a plurality of guide pins 77 (FIG. 2). The tooling 63 is fixedly mounted on a bottom plate or shoe 79 of the press while the tooling 61 is mounted for reciprocation wtih the punch holder 73. An auxiliary table 81 is suitably fixedly mounted on the press.

The main dial plate 53 is a circular disc-like member of substantial diameter having a plurality of equally circumferentially spaced and annularly arranged circular apertures 83. In the embodiment illustrated, eight of the apertures 83 are provided, it being understood that various other numbers thereof may be used depending upon the number of separate work operations that must be performed on the can end. The intermitter 65 rotates the main dial plate 53 rapidly and intermittently to cause each of the apertures 83 to come to rest briefly and sequentially at each of the work stations I–VIII. While the main dial plate 53 is so stopped, the ram 71 descends to cause the tooling 61 and 63 to engage the can end and perform a work operation thereon in a manner described more particularly hereinbelow. To reduce the mass of the main dial plate 57, radially extending slots 85 are also formed therein.

By way of example and with reference to FIGS. 2 and 3, at station I a can end 87 may be loaded into the aperture 83 located at such station. The dial plate 53 is then rapidly rotated in the direction of the arrow in FIG. 2 through approximately 45 degrees to bring the can end 87 to station II at which station there is located appropriate tooling for forming a bubble or dimple 89 upon the next downstroke of the ram 71. The dimple 89 is formed integrally with the material of the can end 87 at a predetermined location thereon. The dial plate 53 is then rotated to bring the can end 87 to station III where the dimple 89 is converted into a hollow rivet 91 and a panel forming operation occurs to form an idented area 93. Similarly, at station IV the can end 87 is formed with score lines 95 which form a tear strip 97 therebetween. At station V additional panel forming occurs to form a second indented area 99. At station VI a tab 101 is positioned over the rivet 91 and the rivet is staked to secure the tab to the tear strip 97. The can end upon completion of the work operation at station VI is an easy-opening can end. Sutiable detection equipment is located at station VII to detect the presence of the tab 101 on the can end 87 so that in the event that, through error or malfunction, no tab is present, the machine will shut down. Finally, at station VII the can end 87 is removed from the main dial plate 53. It will be readily appreciated that the present invention is applicable to can end machines having more or less than eight stations and to easy-open can end processes other than the specific process illustrated in FIG. 3.

One or more detectors may be located at various points around the main dial plate 53 to detect the presence or absence of a can end at such position. In the embodiment illustrated, two photodetectors 103 and 105 (FIG. 2) are suitably fixedly mounted intermediate the stations I and II and III and IV, respectively, and operate to shut down the machine in a manner described more fully in connection with FIG. 36 in the event that no can end is present therebelow when the dial passes beneath the detectors. Specifically, the detector 103 checks the operation of the can end feed mechanism 55 and the detector 105 makes certain that a can end will be present at station IV where the staking operation is to occur. It is important that a can end be present during staking because without the presence of the can end, there is danger that the upper and lower scoring tools will forcibly contact each other on the downstroke of the ram thereby causing damage or destruction of this expensive tooling.

Turning now to FIGS. 4–7, the particular construction of the main dial plate around one of the apertures 83 and the construction and mounting of the tooling at a typical station, namely, station IV at which he scoring operation is carried out, is described. With particular reference to FIG. 4, it can be seen that the aperture 83 is formed by a bore 106 and a counterbore 107 and that an annular nest 108 is seated in the counterbore. The nest is mounted for vertical movement downwardly from the dial plate 53 by a plurality of removable guide pins 109 which extend through the dial plate. As best seen in FIG. 5, the nest 108 includes a metal ring 110, an annular can end retainer 111, and a resilient annular gasket 112 mounted between the ring 110 and the retainer 111. The inner periphery of the annular retainer 111 projects radially inwardly of the gasket 112 and forms a ledge for supporting the periphery of a can end 113. The resilient gasket 112 engages the outer peripheral surface of the can end 113 to hold the can end snugly within the nest. A collar 114 is slidably mounted on each of the guide pins 109 and a spring 115 on each of the guide pins engages the collar and urges the entire nest 108 upwardly to the position shown in FIG. 4 in which the ring 110 engages the main dial plate 53.

The effective size and configuration of the opening 83 when a nest is present therein depends upon the size and shape of the nest 108. With the present invention, the nest 108 is easily removable by removing the nuts 116 on the guide pins 109 and withdrawing the guide pins. It is then a simple matter to insert a new nest having different internal dimensions and/or shape and secure it in place with the guidepins 109 and the nuts 116. The nest construction shown in FIGS. 4–7 is typical and each of the apertures 83 has a smaller nest therein.

The can end 113 is scored by an upper scoring tool 117 and a lower scoring tool 118. The lower scoring tool 118 is removably secured to a lower support block 119 by one or more dowel pins 120 and several easily removable threaded fasteners 121. The support block 119 is similarly secured to the die shoe 79 by one or more dowel pins 122 and several easily removable threaded fasteners 123. One or more spacer plates 124 is provided intermediate the die shoe 79 and the support block 119 to provide height adjustment for the lower scoring tool 118. Another plate 125 is similarly provided intermediate the lower scoring tool 118 and the support block 119 to provide angular adjustment of the lower scoring tool. The lower scoring tool 118 has an upper surface 126, which conforms generally to the shape of the can end 113, and a support punch 127 is carried by the lower scoring tool to fit inside the rivet 128 in the can end 113 to prevent distortion thereof during the scoring operation.

The upper scoring tool 117 is similarly removably attached to an upper support block 129 by dowel pins 130 and screws 131 and the support block 129 is removably attached to the punch holder 73 by dowel pins 132 and screws 133. The upper scoring tool 117 has a lower face 134 which carries a suitable projection (not shown) for scoring the metal of the can end 113 and has a recess 135 to provide a space for the rivet 128. The tooling at the other of the stations around the dial plate 53 can be similarly mounted.

If the tooling 117 and 118 must be changed, either because it is worn or because it is desired to score a different configuration in the can end, the tooling can be quickly and easily removed from the support blocks 119 and 129 without removing the latter from the press thereby facilitating rapid conversion of the machine. Of course, the support blocks may also be removed, if desired, by simply removing the appropriate fasteners and pins.

FIGS. 5–7 illustrate the operation of the scoring tools 117 and 118 and the nest 108. In FIG. 5 the upper scoring tool 117 has advanced downwardly to a position in which it is about to enter the aperture 83. In FIG. 6, the upper scoring tool 117 has entered the aperture 83 and a nest driving surface 136 thereof has just contacted the ring 110 of the nest 108, and the lower face 134 of the upper scoring tool 117 has just contacted the can end 113. In FIG. 7 the upper scoring tool 17 has driven the nest 108 downwardly along the guide pins 109 against the biasing force of the springs 115. This moves the can end 113 downwardly against the lower scoring tool 118 so that the can end is now forcibly engaged between the scoring tools 117 and 118 to allow the scoring operation to be completed. The metal forming operations preformed at the other stations around the dial plate 53 are carried out in a similar manner, and therefore are not described in detail herein.

The load mechanism 55, which is illustrated in FIGS. 8–13, is rigidly mounted on an upper platen 137 which is mounted above the auxiliary table 81. Generally, the can end load mechanism 55 includes feed spiral units 139 (three being illustrated in FIGS. 8 and 9), can end storage means 140 (FIG. 12), and an extendible injector 141. the storage means 140 includes a sleeve 142 (FIG. 12) mounted above the main dial plate 53 in apertures in the upper platen 137 and a gear box 143. The sleeve 142 has a relatively large diameter cylindrical passageway 144 extending therethrough in axial alignment with the aperture 83 at station I. The passageway 144 is, therefore, sized to retain a column of relatively large diameter circular can ends. Several axially extending slots 145 are formed in the wall of the sleeve 142. The slots 145 open downwardly adjacent the aperture 83 and one of the slots 145 is provided for each of the feed spiral units 139. A support ring 146 for several vertically extending guide rods 147 is removably mounted on the upper side of the gear box 143 by threaded fasteners 148. The inner diameter of the ring 146 corresponds to the diameter of the passageway 144, and the guide rods 147 are spaced to support additional similar can ends in the form of a column above the sleeve 142.

The storage means 140 indicates a sleeve 142 (FIG. 12) a column of can ends having a different size or shape as shown in FIG. 12a. To modify the storage means 140, the fasteners 148 are removed to allow removal of the support ring 146 and of the guide rods 147 attached thereto. An insert sleeve 149 having a passageway 150 therethrough is then inserted within the sleeve 142 with a peripheral flange 151 of the sleeve 149 resting on the upper annular surface of the sleeve 142. The passageway 150 has a size and configuration in cross section suitable for supporting the particular size and configuration of can end which is now about to be run. Next, a new support ring 146' carrying guide rods 147' is mounted on the gear box 143 as shown. The spacing between the guide rods 147 and the internal diameter of the support ring 146' are selected so as to be compatible with the diameter and shape of the passageway 150 to allow supporting of a tall column of can ends of the new size and/or shape. Of course, the insert sleeve 149 is provided with slots similar to the slots 145 for a purpose described hereinbelow.

The particular structure of a typical feed spiral unit 139 can best be seen in FIGS. 9, 10, and 13. Each of the feed spiral units 139 includes a frame or housing 152 having a tubular projection 153 (FIG. 13) which is pivotally received in the upper platen 137 and suitably retained therein. The particular pivotal or angular position of the feed spiral unit 139 is fixed by a pair of clamps 154 (FIGS. 9 and 10) which clamp a plate section 155 of the housing 152 against the lower surface of the upper platen 137. The plate section 155 has curved edges 156 and 157 (FIG. 10) so that the housing 152 can be pivoted by loosening the clamps and without the need to remove the clamps and then attach them to new positions on the upper platen.

The housing 152 has a recess 157 (FIG. 13) at the lower inner corner thereof in which a feed spiral 158 having a spiral groove 159 in the peripheral surface thereof is rotatably mounted about a vertical rotational axis by a shaft 160. The feed spiral 158 is driven by an input shaft 161 which projects upwardly through the tubular projection 153, a gear train 162, and the shaft 160. The shafts 160 and 161 and the gear train 162 are mounted within the housing 152 by suitably positioned, sealed, anti-friction bearings.

The housing 152 has a lower plate 163 on the underside thereof extending to a position beneath the feed spiral 158 as shown in FIG. 11. The lower plate 163 has a recess in the upper inner corner thereof in which a retaining finger 164 is pivotally mounted by a pin 165 and urged counterclockwise as viewed in FIG. 10 about such pin by torsion spring 166. Pivotal movement of the finger 164 is limited by a stop 167 attached to the finger and a cooperating slot 168 in the lower plate 163 (FIGS. 10 and 11). A segment 169 of the finger 164 projects through the slots 145 of the sleeve 142 as shown in FIGS. 9–11.

FIGS. 11 and 11a show a cutout plate 170 mounted on top of the feed spiral 158 for the purpose of cutting out a single can end from the column of can ends within the sleeve 142 in a manner described more particularly hereinbelow. The spiral groove 159 of the feed spiral 158 opens at the top of the feed spiral 158 along a circumferentially extending arc which may be of the order of 90 degrees and the cutout plate 170 has a cutout portion 171 which is coextensive with this upward opening in the spiral groove. Assuming the feed spiral 158 is rotating in the direction shown by the arrow in FIG. 11a, the cutout plate 170 has a relatively sharp cutout edge 172 at one end of the cutout portion 171, which serves to cutout the lowermost can end of the column while retaining the remainder of the column thereabove against immediate entry into the feed spiral 158.

All of the feed spirals 139 are similarly constructed and all of them are driven off a single shaft 173 (FIG. 12), which receives its power from the press motor in a manner hereinafter described. As shown in FIG. 12, driving power is transmitted from the shaft 173 through a U-joint 174 and through gears 175, 176, and 177 to a ring gear 178 surrounding the sleeve 142. As shown in FIG. 13, each of the input shafts 161 have a gear 179 thereon meshing with the ring gear 178 whereby the driving power from the shaft 173 is transmitted to the input shafts 161 of each of the feed spiral units 139.

To utilize this portion of the feed mechanism 55, a column of can ends are first loaded into the storage means 140 so that a lowermost can end 180 (FIG. 11) will have the lower edge of its peripheral attaching flange 181 resting on the upper surface of the cutout plate 170 as shown in FIG. 11. In the embodiment illustrated, the can end 180 is supported by the cutout plates 170 of all three feed spirals 158, it being understood that various other numbers of the feed spirals could be provided. With the feed spirals 158 being rotated by the drive train described above, ultimately the cutout portion 171 (FIG. 11a) will come beneath the attaching flange 181 to allow the latter to drop into the spiral groove 159. Immediately thereafter the cutout edge 172 moves in between the lowermost can end 180 and the can end immediately thereabove (not shown) to thereby effectively close the cutout portion 171 to the column of can ends. As the feed spirals 158 are rotated, the attaching flange 181 rides therein and ultimately falls out of the lower end of the spiral grooves 159 onto the segments 169 of the three spring-biased retaining fingers 164, as shown in FIG. 11. The can end 180 is then releasably retained by the three retaining fingers 164 at a position spaced downwardly from the column of can ends and immediately above the nest 108. The inner edge of each of the fingers 164 is inclined as shown in FIG. 11 to permit the fingers to be cammed inwardly against the force of torsion springs 166. The can end injector 141 (FIG. 13) is then operative to pull the can end 180 into the nest 108 at which position the attaching flange 181 rests on the retainer 111 as shown in FIG. 11.

The injector 141 may be any type of unit which is operative to perform this function. In the embodiment illustrated, however, the injector 141 includes an extendible arm or member 182, which is extendible upwardly through the aperture 83 to a position closely adjacent the can end 180 when the latter is held by the retaining fingers 164. The arm has a resilient, concave cup 183 affixed to the upper end thereof and a passageway 184 extending therethrough and opening at the cup 183. A vacuum pump 185 maintains a predetermined low pressure less than atmospheric within the passageway 184 to thereby provide a suction effect on the can end 180. The arm 182 is reciprocable by any suitable means such as a suitable cam unit (not shown) which may be driven by the press motor. Thus, the arm 182 extends upwardly until the cup 183 engages or substantially engages the can end 180 at which time the arm 182 begins its downward stroke. The suction afforded by the vacuum pump 185 on the can end 180 is sufficient to pull the can end downwardly camming the retaining fingers 164 radially inwardly against the biasing action of their respective torsion springs 166 to allow movement of the can end 180 into the nest 108. To this end, the inner edge of the segments 169 of the retaining fingers 164 may be inclined as shown in FIG. 11, to facilitate the outward camming of such fingers.

An important feature of this invention is adaptability of the feed or load mechanism 55 to the handling of can ends of different sizes and configurations. Thus, if it is desired to run can ends of different sizes, the storage means 140 is first changed as shown in FIG. 12a. Next, the clamps 154 (FIGS. 9 and 10) of the several feed spiral units 139 are loosened, and the feed spiral units are pivoted inwardly to a new position shown in dashed lines in FIG. 9 at which the grooves 159 thereof can engage a can end of lesser dimensions. Such inward movement is permitted by the slots 145 and the corresponding slots (not shown) in the insert sleeve 149. Thus, the feed spirals 158 are pivoted inwardly until at least a portion thereof projects through these slots and is exposed within the insert sleeve 150 whereupon the clamps 154 are tightened to fix the angular position of the feed spirals 139. No additional changes in the can end feed mechanism 55 need be made and the changes described above can be made in a manner of minutes.

The number of feed spiral units 139 can be varied so long as a sufficient number thereof are provided to adequately support and convey the lowermost can end 180 away from the column of can ends. It is important to note that the pivotal axis of the feed spiral unit 139 coincides with the rotational axis of the input shaft 161. Therefore, the feed spiral unit 139 can be pivoted to its new angular position without upsetting in any way the drive train necessary for imparting rotary motion to the feed spiral 158. The purpose of the slots 145 and of the corresponding slots in the insert sleeve 149 are to allow the feed spirals 158 to project therethrough and engage the periphery of the lowermost can end 180.

FIG. 13a shows the peripheral attaching flange 181 of the can end 180. The X-dimension shown in FIG. 13a is known as the curl height and may vary from one can end design to another. When the curl height varies more than a predetermined amount, the effective thickness of the cutout plate 170 or the height thereof above the feed spiral 158 must be adjusted accordingly. To this end, the cutout plate 170 may be mounted on removable spacers (not shown) so that the height thereof relative to the feed spiral 158 can be suitably adjusted.

FIG. 14 and 16 illustrate one form of unload mechanism which, in the embodiment illustrated, is positioned at station VIII. The unload mechanism 59 includes an unload sleeve 186 having a relatively large diameter cylindrical passageway 187 extending therethrough which is sized to support a column of finishing easy-open can ends (not shown) of a maximum diameter. The unload sleeve 186 is positioned above the main dial plate 53 and includes a central sleeve section 188 removably attached to the upper platen 137 by screws 189, a support ring 190 carrying vertically extending guide rods 191 and affixed to the platen 137 by screws 192, and a lower ring 193. As best seen in FIG. 16, a radially slidable finger 194 is sandwiched between the lower ring 193 and a retaining ring 195. Preferably more than one of the fingers 194 are provided and each of the fingers 194 is mounted for limited radial movement by a pin 196 in the ring 193 and a cooperating radially extending slot 197 in the finger. A suitable spring 198 urges the several retaining fingers 194 to their radial inward position. The inner face of each of the retaining fingers 194 forms a camming surface 199. The lower ring 193 is removably secured to the central sleeve section 188 by a plurality of fasteners 200 and screws 201 releasably secure the retaining ring 195 to the lower ring 193.

The unload mechanism 159 also includes a reciprocable push member 202 which is reciprocated in any suitable manner such as by a conventional cam unit 203. With a cam end 204 held within the nest 108 as shown in FIG. 14, the push member 202 is extended upwardly by the cam unit 203 to force the can end upwardly into engagement with the camming surfaces 199 of the fingers 194 and urge the latter radially outwardly to allow movement of the can end thereabove. The spring 198 is then operative to urge the fingers 194 radially inwardly to the position shown in FIG. 16, so that upon retraction of the push member 202, the can end 204 rests on an upper surface of the fingers 194 as shown in FIG. 16.

FIG. 15 shows how the unload mechanism 59 can be modified to accept can ends of smaller diameter or other configurations. To convert the unload mechanism 59, the guide rods 191 are first removed from the ring 190 as permitted by set screws 205 (FIG. 14) and then a liner or insert sleeve 206 having a passageway 207 of the desired configuration is inserted into the unload sleeve 186. The insert sleeve 206 has an upper flange into which the guide rods 191 are inserted and retained by set screws 208. The insert sleeve 206 is retained within the unload sleeve 186 by a retainer member 209, which may be in the form of a ring or several spaced individual members each of which is fixedly attached to the ring 190 by a screw 210. With the arrangement shown in FIG. 15, the guide rods 191 are appropriately spaced and the passageway 207 is appropriately sized to receive and support can ends of a different size and/or shape than was supported in the unload sleeve 186. Similarly, corresponding size or shape substitutions may be made in respect of the ring 193 and/or the fingers 194 to allow them to releasably retain can ends of the smaller size or of a different shape.

The tab feed mechanism 57, which is illustrated in FIGS. 17–29, generally includes a tab magazine 211 (FIG. 17), a slide assembly 212, a driving linkage 213, and a supporting frame 214. In FIG. 17 it can be seen that the entire tab feed mechanism 57 is supported on and movable with the frame 214. The frame 214 includes spaced upright posts 215 interconnected at their lower ends by a plate 216. The plate 216 rests on a support plate 217 which is rigidly mounted on the bed of the press. The support 217 has a pair of elongated grooves 218 opening upwardly and a pair of adjustment blocks 219 each of which carries a threaded adjusting member 220. A pair of lugs 221 depend from the plate 216 and are slidingly received, respectively, in the elongated grooves 218. The frame 214 is suitably secured to the support plate 217 by several threaded members 222 which extend through elongated slots 223 in the plate 216.

The adjusting members 220 engage the frame 214. By loosening the threaded members 222 and by appropriate turning of the adjusting members 220, the entire tab feed mechanism 57 is moved as permitted by the slots 223 and as guided by the grooves 218 and the cooperating lugs 221. Thus, the position of the enitre tab feed mechanism 57 relative to the staking station, i.e., station VI (FIGS. 2 and 17) can be adjusted. The purpose of this adjustment is to allow the same tab feed mechanism 57 to be utilized for can ends having different rivet locations thereon. Thus, by adjusting the position of the tab feed mechanism 57, the position of the tab at the last station therein relative to the rivet on the can end therebelow at station VI can be adjusted so that the tab lies directly above the rivet.

The slide assembly 212 must be reciprocated in order that it can feed tabs supported in a column in the tab magazine 211 to the staking station, i.e. station VI. According to one feature of the present invention, such movement is obtained by the driving linkage 213 which drivingly interconnects the slide assembly 212 with the ram of the press. With reference to FIG. 22 it can be seen that a pair of bearing guides 224 and 225 are mounted on one of the upright posts 215 by a pair of beams 226. A rod 227 is directly connected to the punch 73 by a bracket 228 and is mounted for reciprocation with the punch holder by the bearing guides 224 and 225. A lower collar 229 is fixed to the rod 227 and the rod is slidable in an upper collar 230. The upper collar 230 has a pair of recesses on opposite sides thereof in which two arms 231 of a crank 232 (FIG. 17) are received. As best shown in FIG. 17, the crank 232 is pivotally mounted on a suitably supported bracket 232a and has an arm 233 interconnected to drive a link 234. The link 234 is drivingly connected to a reciprocable slide 235 of the slide assembly 212 by a connector 236 (FIG. 29). The upper collar 230 is normally held in the position shown in FIG. 22 by a spring 238 (FIG. 17) which urges the connector 236 against an abutment 237 (FIG. 29).

Specifically, when the punch holder 73, which is affixed to the ram of the press, is on its upward stroke, the rod 227 and the collar 229 move upwardly therewith. The upper collar 230 remains stationary because the rod 227 is slidable therein. When the collar 229 has traveled through the distance represented as Y in FIG. 22, it contacts the lower surface of the collar 230 and urges the latter upwardly for the remainder of the upstroke of the punch holder 73. The remainder of the upstroke or the distance the collar 230 is driven is represented in FIG. 22 as the Z dimension. During this latter portion of the upstroke of the punch holder 73, the crank 232 is pivoted counterclockwise as viewed in FIG. 17 to urge the arm 233 counterclockwise to thereby pull the link 234 to the left as viewed in FIGS. 17 and 29. Thus, on the upstroke of the punch holder 73, the slide 235 is moved through its forward stroke. When the punch holder 73 begins its downstroke, the slide 235, the connector 236 and the entire driving linkage 213, except the rod 227 are immediately urged toward the original position thereof shown in FIGS. 17 and 22 by the spring 238, which is fixed at one end to the arm 233 and at the other end to a stop 239 on the stationary portion of the slide assembly 212 (FIG. 17). Thus, the spring 238 provides a positive return for the slide 235.

With reference to FIG. 22 the Y dimension represents the distance that the rod 227 pretravels before initiating forward movement of the slide 235 and the Z dimension represents the length of the stroke of the rod 227 during which the slide is driven. The present invention provides for adjustment of both the amount of pretravel of the rod 227 and of the length of stroke of the slide 235. According to the embodiment illustrated, this is accomplished by means of a threaded upper end portion 240 of the rod 227 and two pairs of nuts 241 which secure the end portion 240 to a mounting ear 242 of the bracket 228. Thus, by appropriate adjustment of the nuts 241 the rod 227 may be lowered or elevated from the position shown in FIG. 22, thereby loyering or elevating the fixed collar 229 relative to the initial or original position of the movable collar 230. Thus, by lowering the rod 227, the amount of pretravel (the Y dimension) is increased and the length of the stroke of the rod 227 during which the slide 235 is driven, and hence the length of the stroke of the slide 235 (the Z dimension) is correspondingly decreased. It may be desirable to vary the length of the stroke of the slide 235 for various reasons including field adjustment of the length of the stroke of the slide 235 to compensate for variations in the stroke of the ram of the press. Also, by increasing the pretravel, the tabs in the magazine 211 are given greater settling time prior to the next forward stroke of the slide. Thus, the pretravel adjustment feature is desirable because tabs of different designs require different lengths of settling or dwell time.

FIGS. 18 and 29 show a particular form which the connector 236 may assume, it being understood that various types of connectors may be used. The righthand end of the link 234 is pivotally secured to a pair of depending ears 243 by a pin 244. The connector 236 is suitably mounted for reciprocation as by track portions 244a. The slide 235 has a narrow rear end portion 245 (FIGS. 23 and 29) which is secured to a separate block portion 246 of the connector 236 by a screw 247 and pins 248. The block portion 246 is in turn secured to a body portion 249 of the connector 236 by one or more screws 250. The block 246 is separated from a rear surface 351 of the connector 236 by one or more removable spacer plates 252. By adding spacer plates the entire movable slide 235 can be moved further toward the staking station VI and by removing one or more of the spacer plates 252, the entire slide 235 is moved in the opposite direction a corresponding amount. Thus, the use of spacer plates can be used as a substitute for, or a supplement to, movement of the entire tab feed assembly 57 to thereby adjust the machine to run can ends having rivet placements at different locations on the can end. Furthermore, the spacer plates 252 can be used to compensate for variations in stroke length of the slide 235 brought about by adjustment of the pretravel of the rod 227 to thereby assure that the tabs will be fed to the proper location relative to the can end at the staking station VI.

The details of the slide assembly 212 are shown most clearly in FIGS. 21 and 23–28. The slide 235 is mounted for reciprocation through forward and return strokes by a pair of tracks 253 and 254 (FIGS. 25 and 26). The silde 235, which is shown most clearly in FIGS. 23 and 24, includes an elongated metal member 255 having a plurality of upwardly opening longitudinally spaced recesses 256 therein. A leafspring 257 is secured to the member 255 by a screw 258 in each of the recesses 256. A driver 259 is mounted on the leafspring 257 and the forward end of the driver is biased upwardly by the spring 257. Each of the recesses 256 are separated by a rib 260 integral with the elongated member 255 and the forward end of each of the drivers 259 projects upwardly slightly beyond the upper surface of the rib 260. The forward ends 261 of the drivers 269 are preferably curved as shown in FIG. 23 to engage the curved nose of the tab.

FIG. 24 shows a base member 262 for containing the lowermost tabs of a column of tabs shown in FIG. 17. A rearwardmost driver 263 is mounted flat on the elongated member 255 and has a shoulder 264 at the forward end thereof for engaging a nose end 265 of the lowermost tab 266 of the column. In the position shown in FIG. 24, the shoulder 264 is engaging the nose end 265 of the tab 266; however, in the fully returned position of the slide 235 shown in FIG. 29, the shoulder 264 is disposed somewhat to the rear of the nose end 265. It can be seen however, as the slide 235 continues its forward movement from the position shown in FIG. 24, that the tab 266 will be advanced forwardly one step by the driver 263 and that a preceding tab 267 will similarly be advanced one step by the rearwardmost of the drivers 259. A spring-loaded abutment 268 is mounted in the base member 262 and urged downwardly to prevent the rapid initial contact of the driver 259 from knocking or batting the tab 267 significantly forwardly of the driver. That is, the spring-biased abutment 268 engages the tab and resists any sudden and rapid forward movement of the tab 267.

When the slide 235 has completed its forward stroke, the spring 238 returns it to its original position and during such return stroke, the tabs are held stationary by several pairs of spring-biased fingers 269 (FIGS. 23 and 25–27), each pair of which are located in longitudinally spaced relationship along the slide assembly 212. As best seen in FIG. 26, each of the fingers 269 is mounted for movement generally transverse the slide 235 by a slot 270 formed therein and a pin 271 which is received in the slots. The pins 271 are in turn mounted in parallel block members 272 which are suitably mounted as part of the slide assembly and extend longitudinally of the slide 235. The fingers 269 are normally biased inwardly by suitable springs 273 and are adapted to resiliently engage the longitudinal or lateral edges of a tab 274 (FIG. 26). The pairs of opposed fingers 274 are sapced longitudinally an appropriate distance so that they will engage and retain the tabs against rearward movement during the return stroke of the slide 235. The tabs are, therefore, advanced step by step or indexed along a generally linear path toward the staking station. As shown in FIG. 25, one of the blocks 272 has a laterally enlarged portion 275 which is secured to a suitable support 276 by screws 277 and pins 278. A strap 279 is secured to the other block 272 and a door 280 is hinged to the strap by a pin 281 and fastened in the closed position by a screw 282.

FIG. 28 shows the driver 259 which is next to the forwardmost driver. This driver has a resilient strip of metal 283 affixed to the underside thereof at the forward end of the driver which strip projects beyond the forward end to provide support for a tab 284. The strip 283 is inclinned upwardly as it extends forwardly and the forward end 284a of the driver 259 is also inclined to thereby tend to prevent the nose end of the tab, which is immediately adjacent the end 284a from pivoting upwardly.

The tabs are indexed or advanced step by step along the slide assembly 212 to a final position 285 (FIG. 21) at which the tab is positioned directly above the can end in the nest at the staking station in the exact position necessary for positioning of the tab over the rivet in the can end. FIG. 27 illustrates how a tab 286 is releasably retained at such final position 285 by the forwardmost pair of the spring biased retaining fingers 269. Apertures 287 of a size sufficient to permit passage of the tab 286 therethrough are formed immediately above and below the tab 286 at the final station 285.

The magazine 211 (FIG. 17) includes several tab guide rods 288 rigidly mounted on the base member 262 and projecting generally vertically thereabove. The guide rods 288 are arranged to support a column of tabs 289, and two stabilizing brackets 290, which are affixed to a vertical beam 291, maintain proper spacing between the guide rods 290. If desired, curved vertical metal members may be utilized in lieu of the rods 288 to support the column of tabs 289.

Mounted on the beam 291 above the uppermost bracket 290 is a platform 292 on which a pair of posts 293 are vertically mounted. A heavy disc 294 has notches 295 (FIG. 20) in the periphery thereof embracing the posts 293, respectively, the disc 294 applies a downward force to the column of tabs 289 and continues to supply such force as the lowermost tab is injected into the slide assembly 212 by sliding down the vertical post 293, the lowermost position of the disc 294 being reached when the disc comes to rest on the platform 292. Movable with the disc 294 are tab rods 296 and 296a which are received within the ring of the tab 289 and the rivet receiving aperture, respectively, as shown in FIG. 19. A photocell 297 will cause the press motor to shut off if the tab supply drops below a predetermined height within the magazine 211.

In operation of the tab feed mechanism 57 the lowermost tab of the column of tabs is fed into the slide assembly 212 with every forward stroke of the slide 235. Each tab within the slide assembly 212 is moved forwardly one position by the adjacent driver 259 (FIG. 24) upon each forward stroke of the slide 235 and retained against rearward movement upon the return stroke of the slide 235 by the spring fingers 269 (FIG. 26). The final position 285 relative to the can end at the staking station can be varied either by adjustment of the adjusting members 220 (FIG. 17) to move the entire tab feed mechanism 57 relative to the staking station or by the addition or removal of spacer plates 252 (FIG. 29). Furthermore, the amount of pretravel of the rod 227 can be varied for the purpose previously described herein By way of example, if the amount of pretravel of the rod 227, i.e., the Y dimension, were increased, the Z-dimension or the length of the stroke of the slide 235 would be correspondingly decreased as the ram stroke remains constant. This would not effect the original or return position of the slide shown in FIG. 29. However, it would reduce the amount of forward movement of the slide 235 during the forward stroke and thereby tend to move the final position 285 of the tab a corresponding amount to the rear, i.e., away from the staking station.

However, a spacer plate 252 of the appropriate thickness could then be added intermediate the block portion 246 (FIG. 29) and the surface 251 of the connector 236 (FIG. 29) to thereby compensate for the shortened stroke.

FIGS. 30–33 show the tooling for moving of the tab from the final station 285 onto a can end 298 positioned in the nest 108 at the staking station and for staking the rivet to secure the tab to the can end. With reference to FIG. 30, there is shown at station VI a support block 299 having a tooling member 300 releasably secured thereto with such tooling member carrying a staking anvil 301. The tooling carried by the punch holder 73 above the dial plate 53 includes a nest driver 302 for engaging the nest 108 and moving the latter and a can end 298 down against the anvil 301 and a pilot holder 303, with the entire unit being releasably secured to the punch holder 73 by several screws 304 and pins 305. A spring 306 resiliently urges the nest holder 302 downwardly.

The pilot holder 303 is moved downwardly by the punch holder 73 and contacts the tab at the final position 285 and moves the latter downwardly over the rivet 307 (FIGS. 30 and 32). As shown in FIG. 31, the pilot holder 303 includes a body portion 308 having a plunger 309 biased downwardly by a spring 310 and adapted to fit within the ring of the tab. The pilot body 303 also carries a stake punch 311. In order that the tab will be retained against the pilot holder 303 during the downward movement thereof, the pilot holder is provided with apertures 312 (FIG. 33) which are connected by a conduit 313 to a vacuum pump 314 or other source low pressure. Thus, the vacuum present at the apertures 312 causes the tab to adhere to the pilot holder 303.

It will be appreciated that the present invention may be utilized with tabs of various sizes and shapes. In the embodiment illustrated in FIG. 33, however, the tab 315 is a ring tab having a rivet receiving aperture 316 and a ring portion 317.

FIG. 32 illustrates how the rivet 307 is staked accordingly to conventional practice. The rivet of the can end 298 is positioned over a projection 318 on the staking anvil 301 and the stake punch 311 descends to strike the transverse end wall of the rivet 307 to form a bead 319 for securing the tab 315 to the can end 298. Preferably, the transverse end wall of the rivet is squeezed between the stake punch 311 and the anvil 301 so as to extrude some of the metal of such transverse end wall radially outwardly during the striking operation.

FIG. 34 shows diagrammatically the relationship between the dial plate 53, the slide assembly 212 of the tab feed mechanism and the can end 298 at the staking station. In the embodiment illustrated, the longitudinal axis of the slide assembly 212 intersects a radial line drawn from the center of the dial plate 53 through the center of station VI at about a 45 degree angle. The tab 315 is positioned relative to the can end as shown, it being understood that various other orientations and rivet placements are possible.

FIG. 35 shows diagrammatically how the press motor drives the various power actuated units of the machine. The motor is the press motor which is used to supply power for all of the various functions of the machine. As shown in FIG. 35, power is supplied from the motor through a clutch, a belt, a reducer and an infinite indexer to an intermitter. The infinite indexer provides a wide range of speed adjustment. The intermitter intermittently rotates the dial plate 53 as described above. Power from the infinite indexer is transmitted through suitable mechanical means to a cam unit for driving the push member 202 and a second cam unit for reciprocating the cup 183, which pulls the can end into the load station. Power is further transmitted through suitable mechanical means to the feed spirals for loading the can ends into the main dial plate. The ram of the press is driven in a conventional manner by the press motor and the tab feed mechanism is driven off of the ram of the press as described above. It should be understood that the diagram of FIG. 35 has been somewhat simplified in an effort to show how a single power source, i.e. the press motor, supplies power to all of the components of the machine.

FIG. 36 shows a preferred manner of electrically controlling the various functions of the machine. The electrical controls shown in FIG. 36 are, however, substantially simplified to eliminate the various circuits which are applicable solely or substantially to press operation per se or to the several possible modes of operation.

To start the machine, the vacuum pump start switch is momentarily manually closed to thereby energize a vacuum pump motor 2M through a normally closed motor and emergency stop switch, a normally closed belt breakage switch, the vacuum pump start switch, and numerous safety switches. The safety switches may be of the type often used in a press and are not described in detail herein. Energization of the motor 2M closes normally open contacts 2M–1 to provide a holding circuit around the vacuum pump start switch.

Next, or simultaneously with closing of the vacuum pump start switch, a start switch is closed. With energy being supplied to the DC power supply and with contacts S–2 of the start switch closed, a relay 4CR is energized through a limit switch LS–21 and contacts S–2. The limit switch LS–21 is normally closed so long as the clutch is properly prepared for starting of the machine. The relay 4CR is held in by normally open contacts 4CR–1. Energization of the relay 4CR closes normally open contacts 4CR–2 shown just above the DC power supply in FIG. 36. With the DC power supply energized, a relay 5CR will become energized through a normally closed switch F–1. The contacts F–1 are normally closed and open only in the event that a tab detect mechanism 330 indicates that no tab is present on the can end at station VII. As shown in the lower lefthand corner of FIG. 36, the detect mechanism 330 descends with the ram at station VII, and if a tab is present on the can end at such station, the feeler will strike the tab during the downward stroke thereby preventing an arm from descending a sufficient distance to open the contacts F–1. However, in the event that no tab is present, the arm will descend a sufficient distance to open the contacts F–1 and deenergize the relay 5CR. As will be explained more fully hereinbelow, opening of the contacts F–1 will deenergize the press motor 1M. Energization of the relay 5CR closes normally open contacts 5CR–1 and 5CR–2.

Similarly, a relay 7CR will be energized through the normally closed contacts F–1, the contacts 5CR–1 and the photocells 103 or 105 which are also shown in FIG. 2. Energization of the relay 7CR closes the normally open contacts 7CR–1 to thereby energize a relay 8CR. This causes closure of the normally open contacts 8CR–1 to thereby energize the press motor 1M through the start switch contacts S–1, the contacts 8CR–1, and normally open switch IVS. The normally open switch IVS closes when the vacuum pump operated by the vacuum pump motor 2M has built up a predetermined amount of vacuum.

At this point there is power supplied to all of the controls and the press motor 1M is running. Relay 1CR is then energized through a top stop switch, limit switch 6LS, contacts 1M–1, which are closed with the energization of the press motor, an emergency stop switch, and a stop switch. The limit switch 6LS will normally be in a position to permit energization of the relay 1CR; however, if the supply of can ends in the can end feed mechanism drops below a predetermined number, the switch 6LS will engage a contact 6LS–1 to illuminate an end feed light and to prevent energization of, or to deenergize, the relay 1CR. Energization of the relay 1CR causes closure of the normally open contacts 1CR–1 to energize the clutch solenoid, and conversely, should the relay 1CR become deenergized, the clutch would become disengaged. With the clutch solenoid energized, the clutch engages to supply power to the various components of the machine as shown diagrammatically in FIG. 35.

The dial clutch light, the tab missing light, the end missing light and the tag feed light are all normally not illuminated because the relays 4CR, 5CR, 7CR and 6CR, are all normally energized when the machine is running to thereby maintain the contacts 4CR–3, 5CR–3, 7CR–2, and 6CR–1 open. However, if any of these relays should become deenergized, the corresponding warning light would appear thereby giving notice to the operator of the condition which requires immediate action. It should be noted that the relay 6CR is normally energized through contacts F–1 and contacts 5CR–1. Furthermore, if any of the relays 4CR, 5CR or 7CR become deenergized, the relay 8CR also becomes deenergized to open contacts 8CR–1 and stop the motor 1M. Simultaneously, the brake illustrated diagrammatically in FIG. 35 may be automatically energized to bring the press motor and the ram to an immediate stop. Preferably, the brake will be energized to immediately stop the motor and all of the power mechanisms driven thereby whenever the motor 1M is deenergized.

The photocells 103 and 105 are physically located on the machine as illustrated in FIG. 2. In the event that no can end is present when the dial passes beneath either of the photocells 103 or 105, the photocell will emit a signal to cause a diode D–1 to conduct to deenergize the relay 7CR. This illuminates the end missing light by allowing closure of the contacts 7CR–2 and deenergizes the relay 8CR to break the circuit to the press motor 1M. Similarly, should the photocell 297, the physical location of which on the machine is shown in FIG. 17, detect that the height of the column of tabs has dropped below a predetermined level, such photocell would emit a signal causing a diode D–2 to conduct to deenergize the relay 6CR. This opens the contact 6CR–1 to illuminate the tab feed light but does not cause deenergization of the press motor 1M.

The press motor 1M drives the various mechanical components of the machine in a manner shown diagrammatically in FIG. 35. It will be apparent that if the emergency stop switch, any of the safety switches, or the switch IVS should open for any reason, that the press motor 1M would immediately be deenergized and be brought to a rapid stop by the brake.

Although exemplary embodiments of the invention have been shown and described, many changes, modifications, and substitutions may be made by one having ordinary skill in the art without necessarily departing from the spirit and scope of this invention.

We claim:
1. In a machine for converting can ends into easy-opening can ends, the combination of:
   a supporting structure;
   a single rotatable dial plate mounted for rotary movement on said supporting structure about a generally vertical axis, said dial plate having a plurality of spaced can end receiving areas thereon;
   means at each of said can end receiving areas for supporting a can end;
   a load station, an unload station and at least one work station arranged around said dial plate;
   means for imparting intermittent rotary motion to said dial plate about said axis with said dial plate stopping intermittently with said can end receiving areas adjacent said stations, respectively;
   feeder means at said load station for automatically sequentially supplying a single can end to each of said can end receiving areas as such can end receiving area stops adjacent said load station, said feeder means including means for supporting a column of can ends with the lowermost can end of said column generally in alignment with each of said can end receiving means as such can end receiving means stops adjacent said load station;
   tooling means at said at least one work station for converting the can end into an easy opening can end; and
   unloading means at said unload station for automatically removing the easy-opening can end from each of the can end receiving means as such can end receiving means stops thereadjacent.

2. In a combination as defined in claim 1 wherein said means for supporting a can end includes an easily removable nest at each of said can end receiving areas to thereby permit use of said dial plate for can ends of different sizes.

3. A combination as defined in claim 1 wherein said tooling means includes a plurality of forming tools, support blocks mounted on the supporting structure at said one work station, and means for releasably securing the forming tools to the support blocks to thereby permit rapid change of the forming tools without removing the support blocks to accommodate different easy-opening can end designs.

4. A combination as defined in claim 1 wherein said feeder means and the column of can ends are positioned directly above the dial plate at said load station and said feeder means feeds each of the can ends directly downwardly into the can end receiving area therebelow.

5. In a machine for converting can ends into easy-opening can ends, the combination of:
   a supporting structure;
   a single rotatable dial plate mounted for intermittent rotary movement on said supporting structure about a generally vertical axis, said dial plate having a plurality of circumferentially-spaced apertures therein and a nest in each of said apertures for supporting a can end therein;
   a load station, an unload station, and a plurality of work stations arranged around said dial plate;
   means for imparting intermittent rotary motion to said dial plate about said axis with said dial plate stopping intermittently with said nests at said stations;
   means for supporting a column of can ends above said dial plate at said load station;
   load means for feeding a single can end into each of said nests as such nest stops at said load station;
   tooling means at said work stations for converting the can end into an easy-opening can end, said tooling means including means at one of said work stations for attaching a tab to the can end;
   tab feed means for feeding individual tabs along a non-circular path to a final position at said one work station above said main dial plate;
   means for moving said tab downwardly from said final position onto the can end in the nest at said one work station; and
   means at said unload station for removing the easy-open can end from said main dial plate.

6. A combination as defined in claim 5 wherein said load is adjustable to feed can ends of different sizes to said dial plate and wherein said tab feed means is adjustable linearly to compensate for desired changes in location of said final position.

7. A combination as defined in claim 6 wherein said load means includes first and second frame means pivotally mounted on said supporting structure adjacent said column of can ends and first and second circumferentially-spaced feed spirals rotatably mounted on said first and second frame means, respectively, for receiving peripheral portions of the can end at the end of the column and moving said can end downwardly away from the column, said spirals being movable with said frame means to thereby vary the size of can end which can be handled thereby;
   said machine has a ram for operating said tooling means and said tab feed means includes a slide mounted for reciprocating movement in response to movement of the ram for movement through forward and return strokes to advance the tabs one step on each forward stroke and means to adjust the length of the stroke of the slide; and said means at said unloading station includes a sleeve mounted above said dial plate at said unload station and an extendible push member beneath said dial plate extendible through the aperture of the main dial plate at said unload station to force the can end therefrom into said sleeve, and means to retain such can end in said sleeve.

8. In a mechanism for sequentially feeding a column of can end blanks into a device for performing a work operation thereon, the combination of:

support means for supporting the column of can ends; a supporting structure;

first and second means engageable respectively with peripheral regions of the can end at one end of the column for moving said can end to a position spaced from the column of can ends;

means for mounting said first and second means on said supporting structure with at least one of said first and second means being mounted for movement generally toward and away from the other of said first and second means to allow said first and second means to engage peripheral regions of can ends of different sizes to thereby allow the mechanism to be easily adapted to feeding can ends of different sizes; and means for moving the can end from said position into the device.

9. A combination as defined in claim 8 wherein each of said first and second means include a movable member engageable with a peripheral region of the can end and movable to move the can end to said position of the can end and a frame for movably mounting said member, said means for mounting said first and second means includes means for pivotally mounting the frame on said supporting structure.

10. A combination as defined in claim 8 including means mounted on said supporting structure for releasably supporting said can end at said position to thereby permit removal of said can end from said position.

11. In a feeder mechanism for individually feeding a can end from a column of can ends into a machine for converting the can end into easy-opening can ends, the combination of:

a supporting structure;

storage means mounted on said supporting structure for receiving the column of can ends therein, said storage means defining lateral opening means therein;

first and second frame means adjacent said sleeve;

first and second circumferentially-spaced feed spirals rotatably mounted on said first and second frame means, respectively, each of said feed spirals having a peripheral surface with a generally spiral groove therein for receiving a peripheral portion of the can end at the end of the column, each of said feed spirals partially projecting through said opening means to expose a portion of said spiral grooves within said storage means;

means for pivotally mounting said first and second frame means on said supporting structure for generally lateral movement relative to the column about first and second pivotal axes, respectively, to thereby permit adjustment of the can end size that can be received within the grooves of the feed spirals; and each of said frame means having drive train means mounted therein for driving the feed spirals in rotation to move the can end received in said grooves to a position away from the column from which position the can end can be fed into the machine.

12. A combination as defined in claim 11 including an insert within said storage means to support can ends therein of lesser area in plan.

13. A combination as defined in claim 11 wherein each of said drive train means includes an input shaft having an axis of rotation at least substantially coincident with the pivotal axis of the frame means on which it is mounted.

14. In a machine for performing at least one work operation on a can end, the combination of:

a main dial plate mounted for intermittent rotary movement about a generally vertical axis and having a plurality of circumferentially spaced apertures therein, said main dial plate including a nest in each of said apertures for supporting a can end in each of said apertures;

means for supporting a column of can ends above said main dial plate at a load station;

means for intermittently rotating said main dial plate to sequentially bring each of said apertures to said load station beneath the column of can ends for a predetermined interval of time;

means beneath said main dial plate at said load station and automatically extendible upwardly through the aperture at said load station to move the lowermost can end of said column downwardly into the nest of said last mentioned aperture; and means for restraining said other can ends of said column against movement downwardly with said lowermost can end into said nest.

15. A combination as defined in claim 14 wherein said means beneath the column of can ends includes a movable member having a passageway therein opening at a surface of the movable members, said passageway being adapted to carry a pressure less than atmospheric therein to cause the lowermost can end to cling to the movable member during the downward stroke thereof.

16. A combination as defined in claim 14 wherein said means for restraining includes movable members engageable with peripheral regions of said lowermost can end for moving said lowermost can end downwardly away from said column to a position immediately above the aperture at the load station while retaining the other of the can ends and means for releasably retaining said lowermost can end at said position for subsequent withdrawal by said extendible means.

17. A combination as defined in claim 16 including means for mounting said movable members for movement generally inwardly and generally outwardly to allow said movable members to engage peripheral regions of can ends of different sizes.

18. In a machine having a reciprocable ram movable through an upstroke and a downstroke for attaching a tab to an easy-opening can end at a staking station during the terminal portion of the down stroke, the combination of:

a supporting structure;

slide means reciprocably mounted on said supporting structure for movement through forward and return strokes for advancing a tab one step toward a final position adjacent the staking station upon each forward stroke thereof;

drive means drivingly interconnecting the ram and the slide means to drive the slide through the forward stroke thereof on the up stroke of the ram to thereby synchronize tab movement with ram movement;

means for driving the slide means through a rearward stroke;

means disposed along said slide means for holding the tab against rearward movement during the rearward stroke of said slide means whereby the tab is fed individually to said final position;

means for releasably retaining said tab at said final position; and means drivable by said ram for moving said tab from the final position to said staking station during the down stroke of the ram.

19. A combination as defined in claim 18 wherein said drive means drives the slide means on the forward stroke only during the latter portion of the upstroke of the ram.

20. A combination as defined in claim 19 including means for adjusting the length of said latter portion of the upstroke whereby the length of the forward stroke of the slide can be adjusted to the length desired.

21. In a tab feed mechanism for automatically supplying relatively flat tabs to an attaching station at which the individual tabs are automatically attached to other articles, the combination of:
- a slide having forward and rearward ends mounted for reciprocation through forward and return strokes;
- means for reciprocating said slide;
- means for supporting a column of tabs adjacent the rearward end of said slide;
- a driver on said slide adjacent the rearward end thereof and engageable with the end tab of the column during the forward stroke of the slide to separate the end tab from the column and move it forwardly thereof to a first station;
- means for retaining said end tab at said first station during the return stroke of the slide;
- driver means on said slide responsive to subsequent forward strokes of the slide to incrementally advance the tab to a final station adjacent said attaching station;
- means for releasably retaining said end tab in said slide at said final station; and
- means for moving the end tab out of the slide and into said attaching station.

22. A combination as defined in claim 21 wherein the means for reciprocating the slide allows the slide to dwell instantaneously at the end of each return stroke and including means to vary the dwell time to thereby allow the column of tabs sufficient settling time.

23. A combination as defined in claim 21 wherein the slide pretravels through a portion of the forward stroke before said driver and said driver means are operable to drive the tab forwardly whereby the length of the forward stroke slide exceeds the length of travel of the tab in response to such forward stroke and means for changing the effective length of the slide rearwardly of said driver to thereby adjust the position of the final station to compensate for corresponding changes in tab position at the attaching station.

24. A combination as defined in claim 21 wherein said means for reciprocating said slide includes means for adjusting the length of said forward and return strokes and means are provided for changing the effective length of the slide rearwardly of said driver to thereby adjust the position of the final station to compensate for changes in said final position as a result of changing the length of said forward and return strokes.

25. In a machine for making easy-opening can ends of the type having a tab attached to a tear strip, the combination of:
- a main dial mounted for rotary movement and having a plurality of nests thereon for holding can ends;
- a plurality of work stations around said main dial at which work operations can be performed on the can end;
- means at an attaching station for securing a tab to a predetermined location on the can end;
- means for intermittently rotating the main dial to cause each of said nests to sequentially stop at each of said work stations;
- a tab feed mechanism including a magazine for holding a plurality of individual tabs, means for individually and sequentially removing said tabs from said magazine and indexing said tabs generally linearly to a final position closely adjacent and generally aligned with said attaching station and means for releasably retaining said tab at said final station;
- means for automatically removing said releasable retaining means at said tab from said final position and moving said tab to a predetermined location on the can end at said attaching station; and
- means for mounting said tab feed mechanism on said supporting structure for movement toward and away from said attaching station to thereby permit movement of said tab feed mechanism to accurately position the final position relative to the can end at said attaching station.

26. A combination as defined in claim 25 wherein said machine includes a reciprocable ram for operating said means for securing and said means for removing includes pilot holder means driven by the ram for moving the can end from the final position onto the can end.

27. In a device for indexing individual tabs of the type used on easy-opening containers into a machine for attaching the tabs to easy-opening can ends, the combination of:
- an elongated slide having forward and rearward ends;
- track means for mounting said side or reciprocation through forward and return strokes;
- means for supporting a column of tabs adjacent the rearward end of said slide;
- said slide including an elongated member supported by said track means and a plurality of drivers disposed longitudinally along said elongated member;
- means for reciprocating said slide along said track means through forward and return strokes, the rearwardmost driver on said slide being engageable with the end tab of the column of tabs during the forward stroke of the slide to separate the end tab from the column and move it forwardly thereof to a first station, each of the other drivers being sequentially engageable with said end tab on subsequent forward strokes of the slide to advance the end tab step by step through a plurality of positions along said slide to a final position;
- retaining fingers mounted on said track in longitudinally-spaced relationship at said positions for releasably sequentially retaining said end tab during subsequent rearward strokes of the slide; and
- means for moving said end tab out of said final position and into the machine.

28. A combination as defined in claim 27 wherein said slide has a plurality of upward opening longitudinally spaced recesses with each of said recesses having one of said drivers mounted therein, each of said drivers including a driving finger and means for resiliently biasing said driving finger to an inclined position in which the forward end of said driving finger lies above the rearward end thereof so that said forward end can engage the tab and drive such tab forwardly without urging such tab rearwardly on the return stroke of the slide.

29. A combination as defined in claim 28 wherein one of said drivers adjacent the forward end of said slide also includes a spring-like strip projecting forwardly from the forward end of said driving finger.

30. A combination as defined in claim 27 wherein each of said retaining fingers is slidably mounted on said track means for movement toward and away from the lateral periphery of the tab and spring means are provided for urging said retaining fingers inwardly toward the tab.

31. In a machine for performing at least one work operation on a can end, the combination of:
- a main dial plate mounted for intermittent rotary movement about a generally vertical axis and having a plurality of circumferentially-spaced apertures therein, said main dial plate including a nest in each of said apertures for supporting a can end in each of said apertures, said main dial plate having a load station, an unload station, and at least one work station spaced circumferentially around said main dial plate;

means for intermittently rotating said main dial plate to sequentially stop each of said nests at each of said stations;

means at said load station for feeding can ends into said nests when said nests are at said load station;

means at said work station for performing a work operation on the can ends;

a sleeve member at said unload station on one side of said main dial plate, said sleeve member having a passageway extending therethrough of a size and shape to support a column of can ends of a first predetermined size;

a removable liner within said sleeve having a passageway therethrough of a cross-stational size and shape to support a column of can ends of a second predetermined size and shape;

a push member on the other side of said main dial plate extendible through the aperture of the main dial plate at said unload station to push the can end into the passageway of said liner; and means for retaining said can end in said removable liner.

32. A combination as defined in claim 31 wherein said last-mentioned means includes at least one radially movable finger and spring means for urging said finger radially inwardly, said spring member being urged outwardly by the can end being inserted into said removable liner by said pusher member.

References Cited
UNITED STATES PATENTS

| | | | |
|---|---|---|---|
| 3,196,817 | 7/1965 | Fraze | 113—121 |
| 3,245,370 | 4/1966 | Bofinger | 113—1 |
| 3,346,948 | 10/1967 | Henning et al. | 113—121 |
| 3,359,935 | 12/1967 | Rosbottom | 113—1 |

RONALD D. GREFE, Primary Examiner